US012681401B2

(12) United States Patent
Mitsuiki et al.

(10) Patent No.: US 12,681,401 B2
(45) Date of Patent: Jul. 14, 2026

(54) TONER AND TWO-COMPONENT DEVELOPER

(71) Applicant: CANON KABUSHIKI KAISHA, Tokyo (JP)

(72) Inventors: Kenta Mitsuiki, Ibaraki (JP); Hisasuke Kajihara, Ibaraki (JP); Maki Imura, Kanagawa (JP); Nobuhiro Yoshida, Ibaraki (JP); Kohei Yoshiyama, Chiba (JP); Kentaro Kamae, Kanagawa (JP); Yuu Nishimura, Chiba (JP); Kazunari Ooyama, Ibaraki (JP); Nobuyoshi Sugahara, Tokyo (JP); Yuya Chimoto, Chiba (JP); Takaho Shibata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 692 days.

(21) Appl. No.: 18/182,548

(22) Filed: Mar. 13, 2023

(65) Prior Publication Data

US 2023/0341790 A1 Oct. 26, 2023

(30) Foreign Application Priority Data

Mar. 23, 2022 (JP) ................................ 2022-046564
Dec. 21, 2022 (JP) ................................ 2022-204134
Jan. 17, 2023 (JP) ................................ 2023-004801

(51) Int. Cl.
*G03G 9/087* (2006.01)
*G03G 9/107* (2006.01)

(52) U.S. Cl.
CPC ......... *G03G 9/08755* (2013.01); *G03G 9/107* (2013.01)

(58) Field of Classification Search
CPC ...................... G03G 9/08797; G03G 9/08755
See application file for complete search history.

(56) References Cited

U.S. PATENT DOCUMENTS 7,022,449 B2 4/2006 Sugahara
7,138,213 B2 11/2006 Itakura
7,144,668 B2 12/2006 Baba
7,147,980 B2 12/2006 Itakura
7,279,262 B2 10/2007 Fujikawa
7,300,733 B2 11/2007 Sugahara
7,320,850 B2 1/2008 Itakura
7,396,626 B2 7/2008 Fujikawa
7,396,629 B2 7/2008 Baba
7,442,478 B2 10/2008 Itakura
7,833,687 B2 11/2010 Kato
8,084,174 B2 12/2011 Hasegawa
8,323,726 B2 12/2012 Naka
8,697,327 B2 4/2014 Shibata
8,921,023 B2 12/2014 Baba
8,927,188 B2 1/2015 Naka
8,974,994 B2 3/2015 Kamae
8,986,914 B2 3/2015 Fujikawa
9,057,970 B2 6/2015 Ida
9,058,924 B2 6/2015 Komatsu
9,063,443 B2 6/2015 Ishigami
9,348,247 B2 5/2016 Ida
9,500,975 B2 11/2016 Sugahara
9,540,483 B2 1/2017 Ida
9,599,920 B2 3/2017 Sugahara
9,665,023 B2 5/2017 Kamae
9,696,644 B2 7/2017 Ida
9,778,598 B2 10/2017 Onozaki
9,785,070 B2 10/2017 Sugahara
9,897,934 B2 2/2018 Tamura
9,915,885 B2 3/2018 Katsumata
9,958,809 B2 5/2018 Sugahara
9,969,834 B2 5/2018 Ohtsu
10,007,206 B2 6/2018 Sugahara
10,012,918 B2 7/2018 Ishigami
10,012,920 B2 7/2018 Shibata
10,012,921 B2 7/2018 Kamae
10,078,281 B2 9/2018 Ida
10,088,765 B2 10/2018 Miyakai
10,133,201 B2 11/2018 Kamae
10,203,619 B2 2/2019 Yamashita
10,216,108 B2 2/2019 Iwasaki
(Continued)

FOREIGN PATENT DOCUMENTS

EP 2 434 347 A1 3/2012
EP 3 106 922 A1 12/2016
JP 2004-46095 A 2/2004
JP 2016-33648 A 3/2016
JP 2017-191148 A 10/2017
JP 2020-64140 A 4/2020
WO 2013/115409 A1 8/2013

OTHER PUBLICATIONS

Robert F. Fedors, "A Method for Estimating Both the Solubility Parameters and Molar Volumes of Liquids", Polym. Eng. Sci., vol. 14, No. 2 (1974) 147-54.

*Primary Examiner* — Peter L Vajda
(74) *Attorney, Agent, or Firm* — VENABLE LLP

(57) ABSTRACT

A toner includes a toner particle containing a binder resin containing a crystalline polyester. In differential scanning calorimetry (DSC), the toner is heated to 180° C. at a rate of 10° C./min, then cooled to 25° C. at a rate of 10° C./min and successively from 25° C. to 15° C. at a rate of 3° C./min, and heated again to 180° C. at a rate of 10° C./min. As a result, an exothermic amount P1 when the toner is cooled from 80° C. to 40° C. is 1.00 J/g or less, an exothermic amount P2 when the toner is cooled from 25° C. to 15° C. is 0.10 J/g or more, and when a sum of endothermic amounts P3 (J/g) when the toner is heated again from 40° C. to 180° C. and a sum of exothermic amounts P4 (J/g) when the toner is cooled from 180° C. to 40° C. satisfies 2.0≤P3-P4≤10.0.

6 Claims, No Drawings

(56) References Cited

U.S. PATENT DOCUMENTS

| | | | |
|---|---|---|---|
| 10,228,629 | B2 | 3/2019 | Tamura |
| 10,234,777 | B2 | 3/2019 | Ohtsu |
| 10,353,312 | B2 | 7/2019 | Kamae |
| 10,409,188 | B2 | 9/2019 | Sugahara |
| 10,423,090 | B2 | 9/2019 | Ohtsu |
| 10,451,990 | B2 | 10/2019 | Kamae |
| 10,514,624 | B2 | 12/2019 | Tamura |
| 10,642,178 | B2 | 5/2020 | Yamashita |
| 10,656,545 | B2 | 5/2020 | Kamae |
| 10,775,710 | B1 | 9/2020 | Kamae |
| 10,838,317 | B2 | 11/2020 | Sugahara |
| 10,859,931 | B2 | 12/2020 | Hashimoto |
| 10,859,936 | B2 | 12/2020 | Sugahara |
| 10,877,386 | B2 | 12/2020 | Murayama |
| 10,877,391 | B2 | 12/2020 | Matsuo |
| 10,969,705 | B2 | 4/2021 | Shirayama |
| 11,029,617 | B2 | 6/2021 | Chimoto |
| 11,112,711 | B2 | 9/2021 | Ochi |
| 11,131,938 | B2 | 9/2021 | Murayama |
| 11,385,558 | B2 | 7/2022 | Chimoto |
| 11,429,032 | B2 | 8/2022 | Shibata |
| 11,624,986 | B2 | 4/2023 | Kanno |
| 11,662,670 | B2 | 5/2023 | Hama |
| 11,675,283 | B2 | 6/2023 | Kamae |
| 2010/0151377 | A1 | 6/2010 | Uchino |
| 2014/0287353 | A1 * | 9/2014 | Sakamoto .............. G03G 9/093 430/108.4 |
| 2017/0160660 | A1 | 6/2017 | Hasegawa |
| 2017/0315463 | A1 | 11/2017 | Onozaki |
| 2017/0371256 | A1 | 12/2017 | Shirai |
| 2020/0183295 | A1 | 6/2020 | Kanno |
| 2020/0409285 | A1 | 12/2020 | Tokunaga |
| 2021/0055668 | A1 | 2/2021 | Tamura |
| 2021/0181647 | A1 | 6/2021 | Hashimoto |
| 2021/0181651 | A1 | 6/2021 | Kanno |
| 2021/0223710 | A1 | 7/2021 | Takahashi |
| 2021/0278774 | A1 | 9/2021 | Hashimoto |
| 2021/0278775 | A1 | 9/2021 | Kamae |
| 2021/0286282 | A1 | 9/2021 | Kobori |
| 2021/0302853 | A1 | 9/2021 | Murata |
| 2021/0302854 | A1 | 9/2021 | Kitamura |
| 2021/0397106 | A1 | 12/2021 | Kobori |
| 2022/0050398 | A1 | 2/2022 | Ooyama |
| 2022/0197163 | A1 | 6/2022 | Kajihara |
| 2022/0197166 | A1 | 6/2022 | Chimoto |
| 2022/0197174 | A1 | 6/2022 | Kajihara |
| 2022/0342335 | A1 | 10/2022 | Ochi |
| 2022/0373911 | A1 | 11/2022 | Kamae |
| 2022/0373919 | A1 | 11/2022 | Imura |

* cited by examiner

TONER AND TWO-COMPONENT DEVELOPER

BACKGROUND OF THE INVENTION

Field of the Invention

The present invention relates to a toner used in electrophotography, electrostatic recording, electrostatic printing, and the like, and a two-component developer using the toner.

Description of the Related Art

In recent years, as electrophotographic full-color copiers have become more widely used, there has been a demand for not only higher speed and higher image quality, but also additional performance improvements, such as energy-saving performance and compatibility with a wide variety of media.

Specifically, as a toner for saving energy, there is a demand for a toner that can be fixed at lower temperatures and is excellent in low-temperature fixability in order to reduce power consumption in the fixing steps.

Japanese Patent Application Laid-Open No. 2004-046095 proposes, as a toner excellent in low-temperature fixability, a toner using a crystalline polyester as a binder resin of the toner.

In addition, thick coated paper, which is one of a wide variety of media, has high smoothness and a large load when stacked, so that the contact area is large, and the toner of the fixed image is easily transferred to the stacked paper. In other words, there is a demand for a toner excellent in image heat resistance as a toner compatible with a wide variety of media.

For example, Japanese Patent Application Laid-Open No. 2016-033648 proposes, as a toner excellent in low-temperature fixability and image heat resistance, a toner in which the crystalline moiety and the amorphous moiety of a crystalline polyester are controlled.

SUMMARY OF THE INVENTION

The toner described in Japanese Patent Application Laid-Open No. 2004-046095 uses crystalline polyester. Crystalline polyester has a sharp melting property compared to amorphous polyester, and also acts as a plasticizer for amorphous polyester, and thus is an effective material for low-temperature fixing of toner. However, when the crystalline polyester is excessively compatible with a binder resin, the image heat resistance deteriorates, and the image may stick when stored at high temperature.

Meanwhile, the toner described in Japanese Patent Application Laid-Open No. 2016-033648 has a controlled crystalline moiety and amorphous moiety in the crystalline polyester and is easily crystallized when cooled, achieving excellent low-temperature fixability and image heat resistance. However, since the crystalline polyester is easily crystallized, the paper may curl due to rapid volume shrinkage after fixing.

For the above reasons, there is a demand for a toner that satisfies all of low-temperature fixability, image heat resistance, and curl resistance.

An object of the present invention is to provide a toner that solves the above problems. Specifically, an object of the present invention is to provide a toner excellent in all of low-temperature fixability, heat-resistant storage stability, and curl resistance.

The present invention relates to a toner including:

a toner particle containing a binder resin containing a crystalline polyester, in which when differential scanning calorimetry (DSC) of the toner sequentially undergoes (i) a first temperature rise process of raising a temperature of the toner from normal temperature to 180° C. at a rate of 10° C./min, (ii) a first cooling process of cooling the toner from 180° C. to 25° C. at a rate of 10° C./min, (iii) a second cooling process of subsequently cooling the toner from 25° C. to 15° C. at a rate of 3° C./min, and (iv) a second temperature rise process of raising the temperature of the toner again to 180° C. at a rate of 10° C./min, an exothermic amount P1 of an exothermic peak derived from the crystalline polyester present at 40° C. or higher and 80° C. or lower observed in the first cooling process is 1.00 J/g or less, an exothermic amount P2 of an exothermic peak derived from the crystalline polyester observed in the second cooling process is 0.10 J/g or more, and when a sum of endothermic amounts of the endothermic peaks present at 40° C. or higher observed in the second temperature rise process is denoted by P3 (J/g), and a sum of exothermic amounts of the exothermic peaks present at 40° C. or higher observed in the first cooling process is denoted by P4 (J/g), P3-P4 satisfies the following formula (1):

$$2.0 \leq P3-P4 \leq 10.0. \qquad \text{Formula (1)}$$

The present invention also relates to a two-component developer including: a toner; and a magnetic carrier, in which the toner has the above configuration.

Further features of the present invention will become apparent from the following description of exemplary embodiments.

DESCRIPTION OF THE EMBODIMENTS

Features of Present Invention

The present invention is a toner including:

a toner particle containing a binder resin containing a crystalline polyester, in which when differential scanning calorimetry (DSC) of the toner sequentially undergoes (i) a first temperature rise process of raising a temperature of the toner from normal temperature to 180° C. at a rate of 10° C./min, (ii) a first cooling process of cooling the toner from 180° C. to 25° C. at a rate of 10° C./min, (iii) a second cooling process of subsequently cooling the toner from 25° C. to 15° C. at a rate of 3° C./min, and (iv) a second temperature rise process of raising the temperature of the toner again to 180° C. at a rate of 10° C./min, an exothermic amount P1 of an exothermic peak derived from the crystalline polyester present at 40° C. or higher and 80° C. or lower observed in the first cooling process is 1.00 J/g or less, an exothermic amount P2 of an exothermic peak derived from the crystalline polyester observed in the second cooling process is 0.10 J/g or more, and when a sum of endothermic amounts of the endothermic peaks present at 40° C. or higher observed in the second temperature rise process is denoted by P3 (J/g), and a sum of exothermic amounts of the exothermic peaks present at 40° C. or higher observed in the first cooling process is denoted by P4 (J/g), P3-P4 satisfies the following formula (1):

$$2.0 \leq P3-P4 \leq 10.0. \qquad \text{Formula (1)}$$

The inventors of the present invention consider the operations and effects of using the toner of the present invention having such a configuration as follows.

The toner of the present invention contains a binder resin containing crystalline polyester. Here, the "binder resin" refers to the sum of amorphous resin and crystalline resin. At the time of fixing, the crystalline polyester becomes compatible with the amorphous resin, thereby improving low-temperature fixability. After that, if it crystallizes rapidly during cooling, the image heat resistance is good, but there is a problem with curl resistance. This state can be grasped by the exothermic amount P1 at the exothermic peak during cooling in differential scanning calorimetry (DSC), and when P1 is large, the curl resistance may deteriorate. The present inventors considered that in order to improve the curl resistance while not deteriorating the image heat resistance, a system was necessary in which rapid crystallization of the crystalline polyester does not occur upon rapid cooling (P1 is small) but then crystallization of the crystalline polyester occurs by the time limit for slow further cooling and image adhesion Therefore, the present inventors examined all combinations of resins while controlling the compatibility between the amorphous resin and the crystalline resin. As a result, the toner had low-temperature fixability and curl resistance if P1, the crystallization peak during rapid cooling in DSC, was adjusted to 1.00 J/g or less, and had improved image heat resistance if P2, a peak observed when slowly cooled thereafter, was 0.10 J/g or more and P3, the sum of endothermic amounts of endothermic peaks observed in the subsequent second temperature rise, was greater by 2.00 J/g or more than P4, the total exothermic amount of the exothermic peaks observed during cooling to 40° C. In particular, the appearance of a slight peak when the rapid cooling is followed by the slow cooling is important to achieve the above at the same time.

In the toner of the present invention, P1 is 1.00 J/g or less, ensuring curl resistance, and for even better curl resistance, P1 is preferably 0.50 J/g or less.

Further, P3-P4 of the toner of the present invention is 2.0 or more and 10.0 or less. By controlling P3-P4 to fall within this range, it is possible to optimize the crystal growth rate when left to stand. If P3-P4 is less than 2.0, crystallization is insufficient, resulting in poor image heat resistance. Meanwhile, if P3-P4 is greater than 10.0, the quantity of crystals precipitated is excessive, and not only is it impossible to obtain sufficient image heat resistance, but the curling resistance also deteriorates.

The content of the crystalline polyester in the binder resin of the toner of the present invention is preferably 8.0% by mass or more and 15.0% by mass or less from the viewpoint of low-temperature fixability, image heat resistance, and curl resistance. If the content is less than 8.0% by mass, the low-temperature fixability tends to deteriorate, and crystal growth becomes difficult, so that P2 and P3-P4 become too small, and image heat resistance tends to deteriorate. If the content exceeds 15.0% by mass, P1 becomes too large, and not only curl resistance tends to deteriorate, but also image heat resistance tends to deteriorate.

The toner of the present invention preferably further contains a hydrocarbon-based wax, and a difference T1-T2 between a melting point T1 (° C.) of the hydrocarbon-based wax and a melting point T2 (° C.) of the crystalline polyester in the toner preferably satisfies the following formula (2):

$$2 \leq T1 - T2 \leq 10. \quad \text{Formula (2)}$$

Hydrocarbon-based waxes have moderate compatibility with crystalline polyesters. When the content thereof is within the above melting point range, the crystallization of the crystalline polyester can be moderately promoted, and low-temperature fixability, image heat resistance, and curl resistance can be easily achieved at the same time. If T1-T2 is less than 2, the crystallization of the crystalline polyester is excessively promoted, so that the low-temperature fixability and curl resistance tend to deteriorate. If T1-T2 is greater than 10, the crystalline polyester becomes difficult to crystallize, so that the image heat resistance tends to deteriorate.

In the toner of the present invention, the binder resin contains amorphous resin A, amorphous resin B, and amorphous resin C, and when the SP value $[(J/cm^3)^{0.5}]$ of amorphous resin A is denoted by SP1, the SP value $[(J/cm^3)^{0.5}]$ of amorphous resin B is denoted by SP2, and the SP value $[(J/cm^3)^{0.5}]$ of amorphous resin C is denoted by SP3, and furthermore when the SP value $[(J/cm^3)^{0.5}]$ of the above crystalline polyester is denoted by SP4, SP1, SP2, SP3, and SP4 preferably satisfy the following formulas (3) to (5):

$$2.00 \leq SP1 - SP4 \leq 2.90 \quad \text{Formula (3)}$$

$$0.20 \leq SP2 - SP1 \leq 0.60 \quad \text{Formula (4)}$$

$$0.20 \leq SP3 - SP2 \leq 0.60. \quad \text{Formula (5)}$$

By setting the resin configuration to satisfy these formulas, it is possible to control the compatibility of the crystalline polyester, and slowly carry out crystallization without causing excessive crystallization. Amorphous resin A has an SP value closest to that of the crystalline polyester, and when this satisfies the relationship of formula (3), low-temperature fixability is improved. If SP1-SP4 is less than 2.00, the compatibility is excessive and P2 and P3-P4 will become too small, so that image heat resistance tends to deteriorate. When SP1-SP4 is greater than 2.90, P1 becomes too large due to poor compatibility, so that low-temperature fixability and curl resistance tend to deteriorate.

Amorphous resin B is a resin that enhances the compatibility between amorphous resin A and amorphous resin C, and has the role of adjusting the miscibility of amorphous resin A and amorphous resin C by satisfying the formula (4), and thus P2 tends to increase. This improves low-temperature fixability and image heat resistance.

Amorphous resin C is a resin that is required not to increase P1 too much while promoting crystallization of the crystalline polyester, and therefore preferably satisfies the relationship of formula (5).

When SP3-SP2 is less than 0.20, crystallization becomes difficult, and the values of P2 and P3-P4 become small, so that image heat resistance tends to deteriorate. When SP3-SP2 is greater than 0.60, the crystallization is excessive and thus P1 becomes too large, so that low-temperature fixability and curl resistance tend to deteriorate. Also, when two types of amorphous resins are used as the binder resin instead of amorphous resin C, P2 and P3-P4 become too small, so that the image heat resistance tends to deteriorate.

The SP values of these resins can be controlled by controlling the types and amounts of the monomers of the amorphous resin and the crystalline polyester. In particular, amorphous resin C preferably has a polarity difference in its molecule, and preferably contains a hybrid resin of polyester and acrylic.

Toner Configuration of Present Invention

The configuration of the toner of the present invention is described in detail below.

<Amorphous Resin>

As the amorphous resin used in the toner of the present invention, it is preferable to use three types of resins having different SP values. As the configurations thereof, the resin with the lowest SP value is amorphous resin A, the resin with the next lowest SP value is amorphous resin B, and the resin with the highest SP value is amorphous resin C. As for the combination of resins to be used, it is necessary that they can be clearly distinguished by GPC. For example, amorphous resin A may be a low-molecular-weight polyester, amorphous resin B may be a high-molecular-weight polyester, and amorphous resin C may be a hybrid resin obtained by combining a polyester resin and an acrylic resin. These are combinations that differ in weight average molecular weight by a factor of 3 or more, or that have significantly different compositions such as polyester and hybrid resin.

As amorphous resins, the following polymers or resins can be used.

For example, it is possible to use homopolymers of styrene such as polystyrene, poly-p-chlorostyrene, and polyvinyl toluene, and substituted products thereof, styrenic copolymers such as styrene-p-chlorostyrene copolymer, styrene-vinyltoluene copolymer, styrene-vinylnaphthalene copolymer, styrene-acrylate copolymer, styrene-methacrylic acid ester copolymer, styrene-a-methyl chloro methacrylate copolymer, styrene-acrylonitrile copolymer, styrene-vinyl methyl ether copolymer, styrene-vinyl ethyl ether copolymer, styrene-vinyl methyl ketone copolymer, and styrene-acrylonitrile-indene copolymer; polyvinyl chloride, phenolic resin, natural resin-modified phenolic resin, natural resin-modified maleic acid resin, acrylic resin, methacrylic resin, polyvinyl acetate, silicone resin, polyester resin, polyurethane resin, polyamide resin, furan resin, epoxy resin, xylene resin, polyvinyl butyral, terpene resin, coumarone-indene resin, petroleum-based resin, and hybrid resin combining these.

Among these, from the viewpoint of low-temperature fixability, it is preferable to use a polyester resin as a main component. A main component indicates that the content thereof is 50.0% by mass or more.

Monomers used in polyester resins include polyhydric alcohols (dihydric or trihydric or higher alcohols), polyhydric carboxylic acids (dihydric or trihydric or higher carboxylic acids), and acid anhydrides thereof or lower alkyl esters thereof.

Here, in order to prepare a branched polymer, it is effective to partially crosslink the molecules of the amorphous resin, and for this purpose, it is preferable to use a polyfunctional compound having a valence of 3 or more. Therefore, it is preferable to contain, as raw material monomers for the polyester, a trihydric or higher carboxylic acid, an acid anhydride thereof or a lower alkyl ester thereof, and/or a trihydric or higher alcohol.

The following monomers can be used as the polyhydric alcohol monomer used in the polyester resin.

Examples of dihydric alcohol components include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, and hydrogenated bisphenol A, as well as a bisphenol represented by formula (A) and derivatives thereof; and a diol represented by formula (B):

(A)

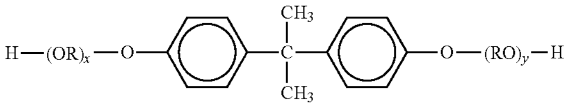

where R is an ethylene or propylene group, x and y are each an integer of 0 or more, and the average value of x+y is 0 or more and 10 or less, and a diol represented by formula (B):

(B)

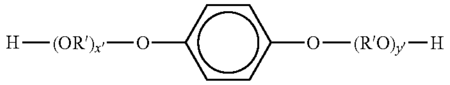

where R' is $-CH_2CH_2-$, $-CH_2-CH(CH_3)-$ or $-CH_2-C(CH_3)_2-$, and x' and y' are each an integer of 0 or more, and the average value of x'+y' is 0 or more and 10 or less.

Examples of trihydric or higher alcohol components include sorbitol, 1,2,3,6-hexanetetrol, 1,4-sorbitan, pentaerythritol, dipentaerythritol, tripentaerythritol, and 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene. Among these, glycerol, trimethylolpropane, and pentaerythritol are preferably used. These dihydric alcohols and trihydric or higher alcohols can be used alone or in combination.

As the polyhydric carboxylic acid monomer used for the polyester resin, the following monomers can be used.

Examples of dihydric carboxylic acid components include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, iso-dodecenylsuccinic acid, n-dodecylsuccinic acid, iso-dodecylsuccinic acid, n-octenylsuccinic acid, n-octylsuccinic acid, iso-octenylsuccinic acid, iso-octylsuccinic acid, and anhydrides of these acids and lower alkyl esters thereof.

Among these, maleic acid, fumaric acid, terephthalic acid, and n-dodecenylsuccinic acid are preferably used.

Examples of trihydric or higher carboxylic acids, acid anhydrides thereof, and lower alkyl esters thereof include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylene carboxyl) methane, 1,2,7,8-octanetetracarboxylic acid, pyromellitic acid, Empol trimer acid, and acid anhydrides thereof or lower alkyl esters thereof.

Among these, 1,2,4-benzenetricarboxylic acid, that is, trimellitic acid or a derivative thereof, is particularly preferably used because it is inexpensive and reaction control is easy. These dihydric carboxylic acids and trihydric or higher carboxylic acids can be used alone or in combination.

The method for producing the polyester is not particularly limited, and known methods can be used. For example, the aforementioned alcohol monomer and carboxylic acid monomer are charged at the same time, subjected to an esterification reaction or a transesterification reaction and a condensation reaction followed by polymerization to produce a polyester resin. Further, the polymerization temperature is not particularly limited, but is preferably in the range of 180° C. or higher and 290° C. or lower.

Polymerization catalysts such as titanium-based catalysts, tin-based catalysts, zinc acetate, antimony trioxide, and germanium dioxide can be used in the polymerization of polyester. A polyester resin polymerized using a tin-based catalyst is more preferable.

The amorphous resin preferably contains a hybrid resin obtained by combining a polyester resin and an acrylic resin. Containing the hybrid resin creates an intramolecular polarity difference, which can promote the crystal growth of the crystalline polyester over time. The method of producing the hybrid resin is not particularly limited, but includes the following:

(i) a method of production by carrying out a transesterification reaction between a polyester component and a polymer containing monomer components having ester groups such as acrylic acid esters or methacrylic acid esters;

(ii) a method of production by carrying out an esterification reaction between a polyester component and a polymer containing monomer components having carboxylic acid groups such as acrylic acid or methacrylic acid; and (iii) a method of production by polymerizing monomer components constituting an acrylic copolymer moiety in the presence of a polyester moiety containing monomer components having unsaturated bonds such as fumaric acid.

As a preferable example, the hybrid resin can be produced by containing, in the monomer components constituting the acrylic copolymer moiety and/or the monomer components constituting the polyester moiety, monomers capable of reacting with both moieties and reacting them.

Among them, the method (iii) is preferable because it is possible to form a structure in which the polyester resin is crosslinked with an acrylic resin. With this structure, the acrylic resin is sandwiched between the polyester resins. This structure has an SP value at which the crosslink moiety is easily compatible with the crystalline polyester, and the polyester resin to be crosslinked has an SP value different from that of the crystalline polyester, but has a certain ratio of ester groups that are structurally compatible with the crystalline polyester.

It is considered that such a structure contributes to promoting crystal growth over time while suppressing rapid crystallization of the crystalline polyester, making it possible to achieve low-temperature fixability, image heat resistance, and curl resistance at the same time. When this hybrid resin is used as one of the three types of amorphous resins, it is preferable to design the SP value of the resin as a whole to be the highest among the three types of amorphous resins, from the viewpoint of crystal growth of the crystalline polyester.

The crosslink moieties are not limited to acrylic resins, and examples thereof include copolymers of styrenic components and acrylic acid-based and/or methacrylic acid-based components.

Monomers used for crosslink moieties include the following.

Examples of monomers used for crosslink moieties include styrene derivatives such as o-methylstyrene, m-methylstyrene, p-methylstyrene, p-methoxystyrene, and p-phenylstyrene, a-methylene aliphatic monocarboxylic acid esters such as methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate, and acrylic esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate. Among these, methyl methacrylate and ethyl methacrylate are preferably used.

When the amorphous resin contains amorphous resin A, amorphous resin B, and amorphous resin C, the content of each of them is preferably 10 parts by mass or more and 60 parts by mass or less based on 100 parts by mass of the binder resin.

<Crystalline Polyester>

The binder resin contained in the toner particle of the toner of the present invention contains crystalline polyester. The crystalline polyester is a resin for which an endothermic peak is observed in differential scanning calorimetry (DSC).

The crystalline polyester is preferably obtained by carrying out a polycondensation reaction on monomer compositions containing, as main components, an aliphatic diol having 2 to 22 carbon atoms and an aliphatic dicarboxylic acid having 2 to 22 carbon atoms.

As the polyhydric alcohol monomer used for the polyester units of the crystalline polyester, the following polyhydric alcohol monomers can be used.

The polyhydric alcohol monomer is not particularly limited, but is preferably a chain (more preferably linear) aliphatic diol, and examples thereof include ethylene glycol, diethylene glycol, triethylene glycol, 1,2-propylene glycol, 1,3-propylene glycol, dipropylene glycol, 1,4-butanediol, 1,4-butadiene glycol, trimethylene glycol, tetramethylene glycol, pentamethylene glycol, hexamethylene glycol, octamethylene glycol, nonamethylene glycol, decamethylene glycol, and neopentyl glycol. Among these, linear aliphatics and $\alpha,\omega$-diols such as ethylene glycol and 1,4-butanediol are particularly preferable.

Among the above alcohol components, preferably 50% by mass or more, more preferably 70% by mass or more, is an alcohol selected from aliphatic diols having 2 to 4 carbon atoms.

In the present invention, polyhydric alcohol monomers other than the above polyhydric alcohols can also be used. Among these polyhydric alcohol monomers, examples of dihydric alcohol monomers include aromatic alcohols such as polyoxyethylenated bisphenol A and polyoxypropylene bisphenol A; and 1,4-cyclohexanedimethanol. Further, among these polyhydric alcohol monomers, examples of trihydric or higher polyhydric alcohol monomers include aromatic alcohols such as 1,3,5-trihydroxymethylbenzene; and aliphatic alcohols such as pentaerythritol, dipentaerythritol, tripentaerythritol, 1,2,4-butanetriol, 1,2,5-pentanetriol, glycerin, 2-methylpropanetriol, 2-methyl-1,2,4-butanetriol, trimethylolethane, and trimethylolpropane.

Furthermore, the crystalline polyester used may be a monohydric alcohol. Examples of the monohydric alcohol include monoalcohols such as n-butanol, isobutanol, sec-butanol, n-hexanol, n-octanol, 2-ethylhexanol, cyclohexanol, and benzyl alcohol, and caprylic alcohol (decanol), undecanol, lauryl alcohol (dodecanol), tridecanol, myristyl alcohol (tetradecanol), pentadecanol, palmityl alcohol (hexadecanol), margaryl alcohol (heptadecanol), stearyl alcohol (octadecanol), nonadecanol, arachidyl alcohol (icosanol), heneicosanol, behenyl alcohol, lignoceryl alcohol, ceryl alcohol, 1-heptacosanol, montanyl alcohol, 1-nonacosanol, and myricyl alcohol.

As the polyhydric carboxylic acid monomer used for the polyester unit of the crystalline polyester, the following polyhydric carboxylic acid monomers can be used.

The polyhydric carboxylic acid monomer is not particularly limited, but is preferably a chain (more preferably linear) aliphatic dicarboxylic acid. Specific examples thereof include oxalic acid, malonic acid, succinic acid, glutaric acid, adipic acid, pimelic acid, suberic acid, glutaconic acid, azelaic acid, sebacic acid, nonane dicarboxylic acid, decane dicarboxylic acid, undecane dicarboxylic acid, dodecane dicarboxylic acid, maleic acid, fumaric acid, mesaconic acid, citraconic acid, and itaconic acid. Hydrolyzed acid anhydrides or lower alkyl esters thereof are also included. Among the above carboxylic acid components, preferably 50% by mass or more, more preferably 70% by mass or more, is a carboxylic acid selected from aliphatic dicarboxylic acids having 12 to 14 carbon atoms.

In the present invention, polyhydric carboxylic acids other than the above polyhydric carboxylic acid monomers can also be used. Among additional polyhydric carboxylic acid monomers, examples of dihydric carboxylic acids include aromatic carboxylic acids such as isophthalic acid and terephthalic acid; aliphatic carboxylic acids such as n-dodecylsuccinic acid and n-dodecenylsuccinic acid; and alicyclic carboxylic acids such as cyclohexanedicarboxylic acid. Acid anhydrides or lower alkyl esters thereof are also included. Further, among additional carboxylic acid monomers, examples of trihydric or higher carboxylic acids include aromatic carboxylic acids such as 1,2,4-benzenetricarboxylic acid (trimellitic acid), 2,5,7-naphthalenetricarboxylic acid, 1,2,4-naphthalenetricarboxylic acid, and pyromellitic acid, and aliphatic carboxylic acids such as 1,2,4-butanetricarboxylic acid, 1,2,5-hexanetricarboxylic acid, and 1,3-dicarboxyl-2-methyl-2-methylenecarboxypropane. Derivatives such as acid anhydrides or lower alkyl esters thereof are also included.

Furthermore, the crystalline polyester may contain a monohydric carboxylic acid. Examples of monohydric carboxylic acids include benzoic acid, naphthalenecarboxylic acid, salicylic acid, 4-methylbenzoic acid, 3-methylbenzoic acid, phenoxyacetic acid, biphenylcarboxylic acid, acetic acid, propionic acid, butyric acid, octanoic acid, capric acid (decanoic acid), undecyl acid, lauric acid (dodecanoic acid), tridecylic acid, myristic acid (tetradecanoic acid), pentadecylic acid, palmitic acid (hexadecanoic acid), margaric acid (heptadecanoic acid), stearic acid (octadecanoic acid), nonadecylic acid, arachidic acid (icosanoic acid), henicosyl acid, behenic acid (docosanoic acid), tetracosanoic acid, hexacosanoic acid, octacosanoic acid, and triacontanoic acid.

The content of the crystalline polyester is preferably 8 parts by mass or more and 15 parts by mass or less based on 100 parts by mass of the binder resin, from the viewpoint of low-temperature fixability, image heat resistance, and curl resistance. If the content is less than 8 parts by mass, the low-temperature fixability deteriorates, and crystallization becomes difficult to proceed, so that the image heat resistance tends to deteriorate. When the content is more than 15 parts by mass, not only the image heat resistance deteriorates, but also crystallization becomes excessive, so that the curl resistance tends to deteriorate.

The crystalline polyester can be produced according to usual polyester synthesis methods. For example, a crystalline polyester can be obtained by subjecting the aforementioned carboxylic acid monomer and alcohol monomer to an esterification reaction or a transesterification reaction, followed by a polycondensation reaction under reduced pressure or by introducing nitrogen gas in accordance with a conventional method. After that, the desired crystalline polyester can be obtained by further adding the above-described aliphatic compounds and carrying out an esterification reaction.

The above esterification or transesterification reaction can be carried out using a usual esterification or transesterification catalyst such as sulfuric acid, titanium butoxide, dibutyltin oxide, manganese acetate, and magnesium acetate, if necessary.

In addition, the above polycondensation reaction can be carried out using a usual polymerization catalyst such as titanium butoxide, dibutyltin oxide, tin acetate, zinc acetate, tin disulfide, antimony trioxide, germanium dioxide, and other known catalysts. The polymerization temperature and catalyst amount are not particularly limited, and may be determined as appropriate.

In the esterification or transesterification reaction or polycondensation reaction, one may employ a method including charging all the monomers at once in order to increase the strength of the resulting crystalline polyester, or a method including first reacting a dihydric monomer and then adding and reacting a trihydric or higher monomer in order to reduce the quantity of low-molecular-weight components.

<Release Agent>

The toner particle of the toner of the present invention preferably contains a release agent. Examples of release agents usable in the toner of the present invention include the following. Hydrocarbon-based waxes such as low-molecular-weight polyethylene, low-molecular-weight polypropylene, alkylene copolymers, microcrystalline wax, paraffin wax, and Fischer-Tropsch wax; hydrocarbon-based wax oxides such as oxidized polyethylene wax or block copolymers thereof, waxes containing fatty acid esters as a main component such as carnauba wax; and partially or wholly deoxidized fatty acid esters such as deoxidized carnauba wax.

The following is further included. Saturated linear fatty acids such as palmitic acid, stearic acid, and montanic acid; unsaturated fatty acids such as brassidic acid, eleostearic acid, and parinaric acid; saturated alcohols such as stearyl alcohol, aralkyl alcohol, behenyl alcohol, carnauvyl alcohol, ceryl alcohol, and myricyl alcohol; polyhydric alcohols such as sorbitol; esters of fatty acids such as palmitic acid, stearic acid, behenic acid, and montanic acid with alcohols such as stearyl alcohol, aralkyl alcohol, behenyl alcohol, carnauvyl alcohol, ceryl alcohol, and myricyl alcohol; fatty acid amides such as linoleic acid amide, oleic acid amide, and lauric acid amide; saturated fatty acid bisamides such as methylenebis-stearic acid amide, ethylenebis-capric acid amide, ethylenebis-lauric acid amide, and hexamethylenebis-stearic acid amide; unsaturated fatty acid amides such as ethylenebis-oleic acid amide, hexamethylenebis-oleic acid amide, N,N'-dioleyl adipic acid amide, and N,N'-dioleyl sebacic acid amide; aromatic bisamides such as m-xylene bisstearic acid amide and N,N'-distearyl isophthalic acid amide; aliphatic metal salts such as calcium stearate, calcium laurate, zinc stearate, and magnesium stearate (generally referred to as metal soaps); waxes obtained by grafting a vinyl-based monomer such as styrene or acrylic acid to an aliphatic hydrocarbon-based wax; partial esters of fatty acids and polyhydric alcohols such as behenic acid monoglyceride; and methyl ester compounds having a hydroxyl group obtained by hydrogenation of vegetable oil.

Among these release agents, hydrocarbon-based waxes such as paraffin wax and Fischer-Tropsch wax are preferable from the viewpoint of promoting crystallization of crystalline polyesters.

The content of the release agent is preferably 1 part by mass or more and 10 parts by mass or less based on 100 parts by mass of the binder resin. Here, the binder resin refers to the sum of the crystalline polyester and the amorphous resin.

Moreover, in an endothermic curve during temperature rise measured with a differential scanning calorimeter (DSC), the peak temperature of the maximum endothermic peak of the wax is preferably 80° C. or higher and 110° C. or lower. The relationship between the melting point T1 (° C.) of the wax in the toner and the melting point T2 (° C.) of the crystalline polyester is preferably as follows:

$$2 \leq T1 - T2 \leq 10.$$

With this relationship, it is possible to induce the crystallization of the crystalline polyester starting from crystallization of the wax, and control the crystallization behavior of the crystalline polyester during cooling.

<Dispersant>

When the toner particle of the toner of the present invention contains a release agent, it is preferable to contain a dispersant in order to disperse a wax in the resin. The dispersant used may be a known one, and when a hydrocarbon-based wax is contained as a wax, it is preferable to contain a polymer having a structure in which a vinyl-based resin component and a hydrocarbon compound have reacted with each other, in order to disperse the wax in the resin. Among these, it is preferable to contain a graft polymer obtained by graft polymerization of a vinyl-based monomer to a polyolefin.

When the polymer is contained, the compatibility between the wax and the resin is promoted, and adverse effects such as poor charging due to poor dispersion of the wax and contamination of members are less likely to occur. In addition, the content of the dispersant is preferably 1.0 parts by mass or more and 15.0 parts by mass or less, based on 100 parts by mass of the binder resin. When the content is within this range, the wax tends to be uniformly dispersed in the amorphous resin. The polyolefin is not particularly limited as long as it is a polymer or copolymer of unsaturated hydrocarbons, and various polyolefins can be used. In particular, polyethylene-based and polypropylene-based materials are preferably used. Two or more of these may be used.

Examples of monomers having vinyl-based groups include the following.

Styrenic units, such as styrenes including styrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, and p-n-dodecylstyrene, and derivatives thereof.

Vinyl-based units containing N atoms, such as amino group-containing a-methylene aliphatic monocarboxylic acid esters such as dimethylaminoethyl methacrylate and diethylaminoethyl methacrylate; and acrylic acid and methacrylic acid derivatives such as acrylonitrile, methacrylonitrile, and acrylamide.

Vinyl-based units containing carboxy groups, such as unsaturated dibasic acids such as maleic acid, citraconic acid, itaconic acid, alkenyl succinic acid, fumaric acid, and mesaconic acid; unsaturated diacid anhydrides such as maleic anhydride, citraconic anhydride, itaconic anhydride, and alkenyl succinic anhydride; half esters of unsaturated dibasic acids such as maleic acid methyl half ester, maleic acid ethyl half ester, maleic acid butyl half ester, citraconic acid methyl half ester, citraconic acid ethyl half ester, citraconic acid butyl half ester, itaconic acid methyl half ester, alkenyl succinic acid methyl half ester, fumaric acid methyl half ester, and mesaconic acid methyl half ester; unsaturated dibasic acid esters such as dimethyl maleic acid and dimethyl fumaric acid; α,β-unsaturated acids such as acrylic acid, methacrylic acid, crotonic acid, and cinnamic acid; α,β-unsaturated acid anhydrides such as crotonic anhydride and cinnamic anhydride, and anhydrides of the above α,β-unsaturated acids and lower fatty acids; and alkenyl malonic acids, alkenyl glutaric acids, alkenyl adipic acids, anhydrides thereof, and monoesters thereof.

Vinyl-based units containing hydroxy groups, such as acrylic acid and methacrylic acid esters such as 2-hydroxyethyl acrylate, 2-hydroxyethyl methacrylate, and 2-hydroxypropyl methacrylate; and 4-(1-hydroxy-1-methylbutyl)styrene and 4-(1-hydroxy-1-methylhexyl)styrene.

Ester units composed of acrylic acid esters, such as acrylic acid esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, and phenyl acrylate.

Ester units composed of methacrylic acid esters, such as a-methylene aliphatic monocarboxylic acid esters such as cyclohexyl methacrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate. Two or more of these may be used.

The dispersant used in the present invention can be obtained by a known method such as the reaction between these polymers described above, or the reaction between the monomer of one polymer and the other polymer.

<Colorant>

Examples of colorants that can be contained in the toner of the present invention include the following.

Black colorants include carbon black; and those toned black using yellow colorants, magenta colorants, and cyan colorants. As the colorant, a pigment may be used alone, but it is more preferable to use a dye and a pigment in combination to improve the definition from the viewpoint of full-color image quality.

Examples of magenta toner pigments include the following. C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48:2, 48:3, 48:4, 49, 50, 51, 52, 53, 54, 55, 57:1, 58, 60, 63, 64, 68, 81:1, 83, 87, 88, 89, 90, 112, 114, 122, 123, 146, 147, 150, 163, 184, 202, 206, 207, 209, 238, 269, and 282; C.I. Pigment Violet 19; and C.I. Vat Red 1, 2, 10, 13, 15, 23, 29, 35.

Examples of magenta toner dyes include the following. Oil-soluble dyes such as C.I. Solvent Red 1, 3, 8, 23, 24, 25, 27, 30, 49, 81, 82, 83, 84, 100, 109, and 121; C.I. Disperse Red 9; C.I. Solvent Violet 8, 13, 14, 21, and 27; and C.I. Disperse Violet 1, and basic dyes such as C.I. Basic Red 1, 2, 9, 12, 13, 14, 15, 17, 18, 22, 23, 24, 27, 29, 32, 34, 35, 36, 37, 38, 39, and 40; and C.I. Basic Violet 1, 3, 7, 10, 14, 15, 21, 25, 26, 27, and 28.

Examples of cyan toner pigments include the following. C.I. Pigment Blue 2, 3, 15:2, 15:3, 15:4, 16, 17; C.I. Vat Blue 6; C.I. Acid Blue 45, and a copper phthalocyanine pigment having a phthalocyanine skeleton substituted with 1 to 5 phthalimidomethyl groups.

Examples of cyan toner dyes include C.I. Solvent Blue 70.

Examples of yellow toner pigments include the following. C.I. Pigment Yellow 1, 2, 3, 4, 5, 6, 7, 10, 11, 12, 13, 14, 15, 16, 17, 23, 62, 65, 73, 74, 83, 93, 94, 95, 97, 109, 110, 111, 120, 127, 128, 129, 147, 151, 154, 155, 168, 174, 175, 176, 180, 181, and 185; and C.I. Vat Yellow 1, 3, and 20.

Examples of yellow toner dyes include C.I. Solvent Yellow 162.

The amount of the colorant used is preferably 0.1 parts by mass or more and 30 parts by mass or less based on 100 parts by mass of the binder resin.

<Charge Control Agent>

The toner of the present invention may also contain a charge control agent, if desired. As the charge control agent contained in the toner, known ones can be used, and a metal compound of an aromatic carboxylic acid is particularly preferable because it is colorless, has a high charging speed of the toner, and can stably maintain a constant charge amount.

Examples of negative charge control agents include metal salicylate compounds, metal naphthoate compounds, metal dicarboxylic acid compounds, and polymeric compounds having sulfonic acid or carboxylic acid as side chains, high-molecular-weight compounds having sulfonates or sulfonate esters as side chains, polymeric compounds having carboxylates or carboxylic acid esters as side chains, and boron compounds, urea compounds, silicon compounds, and calixarene. Examples of positive charge control agents include quaternary ammonium salts, polymeric compounds having the quaternary ammonium salts in side chains thereof, guanidine compounds, and imidazole compounds. The charge control agent may be added internally or externally to the toner particle. The amount of the charge control agent to be added is preferably 0.05 parts by mass or more and 10 parts by mass or less based on 100 parts by mass of the binder resin.

<Inorganic Fine Particles>

The toner can also contain inorganic fine particles as needed. The inorganic fine particles may be added internally to the toner particle, or may be mixed with the toner particle as an external additive. As the external additive, inorganic fine powders such as silica, titanium oxide, and aluminum oxide are preferred. The inorganic fine powder is preferably hydrophobized with a hydrophobing agent such as a silane compound, silicone oil, or a mixture thereof.

As an external additive for improving fluidity, inorganic fine powder having a specific surface area of 50 $m^2/g$ or more and 400 $m^2/g$ or less is preferable. In order to stabilize durability, inorganic fine powder having a specific surface area of 10 $m^2/g$ or more and 50 $m^2/g$ or less is preferable. In order to improve fluidity and stabilize durability at the same time, an inorganic fine powder having a specific surface area within the above range may be used in combination.

The content of the external additive used is preferably 0.10 parts by mass or more and 10.0 parts by mass or less, based on 100 parts by mass of the toner particle. A known mixer such as a Henschel mixer can be used to mix the toner particle and the external additive.

[Developer]

The toner of the present invention can also be used as a one-component developer, but is preferably mixed with a magnetic carrier to be used as a two-component developer in order to supply stable images.

When the toner is mixed with a magnetic carrier to be used as a two-component developer, the mixing ratio of the magnetic carrier in that case is preferably 2% by mass or more and 15% by mass or less, more preferably 4% by mass or more and 13% by mass or less, as the toner concentration in the two-component developer.

<Magnetic Carrier>

As the magnetic carrier, it is possible to use a generally known carrier such as iron oxide; metal particles such as iron, lithium, calcium, magnesium, nickel, copper, zinc, cobalt, manganese, chromium, strontium, and rare earths, alloy particles thereof, and oxide particles thereof; magnetic materials such as ferrite and magnetite; and magnetic material-dispersed resin carriers (so-called resin carriers) containing a magnetic material and a binder resin that holds that magnetic material in a dispersed state, and magnetic carriers in the form of ferrite or magnetite particles having pores filled with a resin.

As the magnetic carrier, any of the magnetic materials described above may be used directly, or a magnetic material obtained by coating the surface of any of the above magnetic materials as a core with a resin may be used. From the viewpoint of improving the chargeability of the toner, it is preferable to use, as the magnetic carrier, a magnetic material obtained by coating the surface of any of the above magnetic materials as a core with a resin.

The resin for coating the core is not particularly limited, and known resins can be selected and used as long as the above toner characteristics are not impaired. It is possible to use resins such as (meth)acrylic resins, silicone resins, urethane resins, polyethylene, polyethylene terephthalate, polystyrene, and phenolic resins, or copolymers or polymer mixtures containing these resins. In particular, it is preferable to use a (meth)acrylic resin or a silicone resin, from the viewpoint of chargeability and prevention of adhesion of foreign matter to the carrier surface. In particular, a (meth) acrylic resin having an alicyclic hydrocarbon group such as a cyclohexyl group, a cycloheptyl group, a cyclooctyl group, a cyclopentyl group, a cyclobutyl group, or a cyclopropyl group is a particularly preferable form because the surface (coat surface) of the resin coat layer that coats the surface of the magnetic material becomes smooth, and adhesion of toner-derived components, such as binder resins, release agents, and external additives, can be suppressed.

Production Method

The method of producing a toner particle of the present invention is not particularly limited, and it is possible to use known methods such as the pulverization method, the suspension polymerization method, the dissolution suspension method, the emulsion aggregation method, and the dispersion polymerization method.

An example procedure for producing toner by the pulverization method will be described below.

In the raw material mixing step, as materials constituting the toner particle, for example, predetermined amounts of additional components such as a crystalline polyester and an amorphous resin, and, if necessary, a release agent, a colorant, and a charge control agent are weighed, blended, and mixed. Examples of the mixing device include a double-cone mixer, a V-type mixer, a drum-type mixer, a super mixer, a Henschel mixer, a Nauta mixer, and Mechano Hybrid (manufactured by NIPPON COKE & ENGINEERING CO., LTD.).

Next, the mixed materials are melt-kneaded to disperse the wax and the like in the binder resin. The kneading and discharging temperature can be appropriately adjusted depending on the binder resin and colorant used, but is generally preferably 100 to 180° C. In the melt-kneading step, a pressure kneader, a batch kneader such as a Banbury mixer, or a continuous kneader can be used, and a single-screw or twin-screw extruder is the mainstream because of its superiority in continuous production. Examples include KTK Type Twin Screw Extruder (manufactured by Kobe Steel, Ltd.), TEM Type Twin Screw Extruder (manufactured by Toshiba Machine Co., Ltd.), PCM Kneader (manufactured by Ikegai Corp.), Twin Screw Extruder (manufactured by K.C.K. Co., Ltd.), Co-Kneader (manufactured by Buss), and Kneadex (manufactured by NIPPON COKE & ENGINEERING CO., LTD.). Furthermore, the resin composition obtained by melt-kneading may be rolled with two rolls or the like and cooled with water or the like in the cooling step.

The cooled resin composition is then pulverized to a desired particle diameter in the pulverization step. The pulverization step carries out coarse pulverization using a pulverizer such as a crusher, a hammer mill, or a feather mill, and after that, fine pulverization is further carried out by with, for example, Kryptron System (manufactured by Kawasaki Heavy Industries Ltd.), Super Rotor (manufactured by Nisshin Engineering Inc.), Turbo Mill (manufactured by Freund-Turbo Corporation), or an air jet type fine pulverizer.

Then, if necessary, classification is carried out using a classifier or a sieving machine such as an inertial classification type Elbow-Jet (manufactured by Nittetsu Mining Co., Ltd.), centrifugal classification type Turboplex (manufactured by Hosokawa Micron Corporation), TSP Separator (manufactured by Hosokawa Micron Corporation), or Faculty (manufactured by Hosokawa Micron Corporation) to obtain a classified product (a toner particle).

The toner particle may be used as the toner as they are, or if necessary, the toner may be obtained by adding an external additive to the surface of the toner particle. Examples of methods for externally adding external additives include a method in which the toner particle and various known external additives are blended in predetermined amounts, and stirred and mixed using a mixing device as an external adder, such as a double-cone mixer, a V-type mixer, a drum-type mixer, a super mixer, a Henschel mixer, a Nauta mixer, Mechano Hybrid (manufactured by NIPPON COKE & ENGINEERING CO., LTD.), or Nobilta (manufactured by Hosokawa Micron Corporation).

Measurement Method of Physical Properties

Next, the method of measuring each physical property related to the present invention is described.

<Separation of Each Material from Toner>

Materials are separated from the toner by using differences in solubility in solvents and GPC.

Examples are shown below.

First separation: The toner is dissolved in methyl ethyl ketone (MEK) at 23° C. to separate the soluble matter (amorphous resin) and the insoluble matter (crystalline polyester, and optionally added wax, wax dispersant, colorant, inorganic particles, and the like).

Second separation: The insoluble matter obtained in the first separation (crystalline polyester, and optionally added wax, wax dispersant, colorant, inorganic particles, and the like) is dissolved in MEK at 100° C. to separate the soluble matter (crystalline polyester, wax, and wax dispersant) and the insoluble matter (colorant and inorganic particles).

Third separation: The soluble matter obtained in the second separation (crystalline polyester, wax, and wax dispersant) is dissolved in chloroform at 23° C. to separate the soluble matter (crystalline polyester) and the insoluble matter (wax and wax dispersant).

Fourth separation: If the amorphous resin is further separated, the soluble matter obtained in the first separation is separated by GPC using molecular weight and polarity difference.

<Calculation of Content Ratio of Monomer Units in Amorphous Resin and Crystalline Polyester>

The content of the constituent monomers in the resin is calculated by the following method using NMR.

The resin separated by the above method is weighed at 5 mg, dissolved in deuterated THE or deuterated chloroform, and subjected to $^1$H-NMR measurement, and the composition ratio is calculated from the integrated value of each peak. Specific equipment conditions are as follows.

(Measurement Conditions)

Measuring device: JNM-ECA400 FT-NMR (JEOL)

Measurement nuclide: $^1$H

Solvent: deuterated THE or deuterated chloroform

Measurement frequency: 400 MHz

Pulse width: 5.0 μs

Frequency range: 10500 Hz

Number of integration: 64 times

Measurement temperature: room temperature

<Measurement of Glass Transition Temperature (Tg) of Resin>

The glass transition temperature of the resin is measured in accordance with ASTM D3418-82 using a differential scanning calorimeter "Q2000" (manufactured by TA Instruments).

The melting points of indium and zinc are used to correct the temperature of the device detector, and the heat of fusion of indium is used to correct the amount of heat.

Specifically, the resin or toner is precisely weighed at about 3 mg, placed in an aluminum pan, and measured under the following conditions using an empty aluminum pan as a reference:

Rate of temperature rise: 10° C./min

Measurement start temperature: 30° C.

Measurement end temperature: 180° C.

The temperature is measured at a rate of temperature increase of 10° C./min within the measurement range of 30° C. to 180° C. The temperature is once raised to 180° C., maintained for 10 minutes, then lowered to 30° C., and then raised again. In this second temperature rise process, a change in specific heat is obtained in the temperature range of 30 to 100° C. The intersection point of the differential thermal curve with the line between the midpoints of the baselines before and after the change in specific heat occurs is defined as the glass transition temperature (Tg) of the resin.

<Differential Scanning Calorimetry (DSC) of Toner>

Differential scanning calorimetry of the toner is carried out using a differential scanning calorimeter "Q2000" (manufactured by TA Instruments).

The melting points of indium and zinc are used to correct the temperature of the device detector, and the heat of fusion of indium is used to correct the amount of heat.

Specifically, the toner is precisely weighed at about 3 mg, placed in an aluminum pan, and measured under the following conditions using an empty aluminum pan as a reference.

The temperature is raised from 20 to 180° C. at a rate of 10° C./min, then cooled to 25° C. at a rate of 10° C./min, and the toner is cooled from 25° C. to 15° C. at a rate of 3° C./min. After that, the temperature is raised to 180° C. at a rate of 10° C./min for the second time.

In the cooling at a rate of 10° C./min, the exothermic amount of the peak derived from the crystalline polyester present at 40° C. or higher and 80° C. or lower is denoted by P1 (J/g), the exothermic amount of the crystallization peak derived from the crystalline polyester present in the cooling process at a rate of 3° C./min is denoted by P2 (J/g), the sum of endothermic amounts of the endothermic peaks present at 40° C. or higher observed in the second temperature rise process is denoted by P3 (J/g), and the sum of exothermic amounts of the exothermic peaks present at 40° C. or higher observed in the cooling step is denoted by P4 (J/g), and the endothermic peaks observed in the second temperature rise process are used to determine the melting point T1 of the wax and the melting point T2 of the crystalline polyester. If it is difficult to identify each peak only by measuring the toner, differential scanning calorimetry can be carried out on the separated materials, alone or mixed with an amorphous resin, to identify to which material T1 and T2 in the toner belong.

<SP Value Calculation Method>

For the SP values of amorphous resin A, amorphous resin B, amorphous resin C, and crystalline polyester, the calculation method proposed by Fedors is used to determine evaporation energies (Δei) (cal/mol) and molar volumes (Δvi) ($cm^3$/mol) for atoms or atomic groups in the molecular structure using tables given in "Polym. Eng. Sci., 14(2), 147-154 (1974)", and $2.0455\times(\Sigma\Delta ei/\Sigma\Delta vi)^{0.5}$ is determined as SP value $(J/cm^3)^{0.5}$.

<Measurement of Molecular Weight of Amorphous Resin by GPC>

The molecular weight distribution of the THF-soluble matter of the resin is measured by gel permeation chromatography (GPC) as follows.

First, the toner is dissolved in tetrahydrofuran (TIF) at room temperature for 24 hours. Then, the resulting solution is filtered through a solvent-resistant membrane filter "Maeshori Disk" (manufactured by Tosoh Corporation) having a pore diameter of 0.2 m to obtain a sample solution. Note that the sample solution is adjusted so that the concentration of THF-soluble components is about 0.8% by mass. This sample solution is used for measurement under the following conditions:

Device: HLC8120 GPC (detector: RI) (manufactured by Tosoh Corporation)
Column: 7 rows, Shodex KF-801, 802, 803, 804, 805, 806, 807 (manufactured by Showa Denko)
Eluent: tetrahydrofuran (TIF)
Flow rate: 1.0 ml/min
Oven temperature: 40.0° C.
Sample injection volume: 0.10 ml A molecular weight calibration curve prepared using a standard polystyrene resin (for example, trade name "TSK Standard Polystyrene F-850, F-450, F-288, F-128, F-80, F-40, F-20, F-10, F-4, F-2, F-1, A-5000, A-2500, A-1000, and A-500", manufactured by Tosoh Corporation) is used to calculate the molecular weight of the sample.

<Measurement of Molecular Weight of Crystalline Polyester by GPC>

First, the crystalline polyester is dissolved in o-dichlorobenzene at room temperature over 24 hours. Then, the resulting solution is filtered through a solvent-resistant membrane filter "Maeshori Disk" (manufactured by Tosoh Corporation) having a pore diameter of 0.2 m to obtain a sample solution. Note that the sample solution is adjusted so that the concentration of THF-soluble components is about 0.8% by mass. This sample solution is used for measurement under the following conditions:

Device: HLC-8121GPC/HT (manufactured by Tosoh Corporation)
Column: 2 rows, TSKgel GMHHR-H HT (7.8 mm I.D×30 cm) (manufactured by Tosoh Corporation)
Detector: RI for high temperature
Temperature: 135° C.
Solvent: o-dichlorobenzene (0.05% ionol added)
Flow rate: 1.0 ml/min
Sample: 0.4 ml of 0.1% sample was injected Measurement is carried out under the above conditions, and a molecular weight calibration curve prepared from a monodisperse polystyrene standard sample is used to calculate the molecular weight of the sample. Furthermore, it is calculated by converting to polyethylene using a conversion formula derived from the Mark-Houwink viscosity formula.

<Method for Measuring Softening Point of Amorphous Resin>

The softening point of the resin is measured using a constant-load extrusion type capillary rheometer "Flow Property Evaluation Device Flowtester CFT-500D" (manufactured by Shimadzu Corporation) according to the manual attached to the device. This device heats and melts the measurement sample filled in the cylinder while applying a constant load from above the measurement sample by means of a piston, and extrudes the molten measurement sample through a die at the bottom of the cylinder, making it possible to obtain a flow curve showing the relationship between the amount of piston descent and the temperature at this time.

In the present invention, the softening point is the "Melting Temperature in the ½ Method" described in the manual attached to the "Flow Property Evaluation Device Flowtester CFT-500D". Note that the melting temperature in the ½ method is calculated as follows. First, ½ of the difference between the amount of piston descent Smax when the outflow ends and the amount of piston descent Smin when the outflow starts is obtained (defined as X, X=(Smax−Smin)/2). The temperature of the flow curve when the amount of piston descent is X in the flow curve is the melting temperature in the ½ method.

The measurement sample is resin at about 1.0 g, which is compressed and molded for about 60 seconds at about 10 MPa using a tableting press (for example, NT-100H, manufactured by NPa SYSTEM CO., LTD.) in an environment of 25° C. to form a cylindrical shape with a diameter of about 8 mm.

The measurement conditions for CFT-500D are as follows:

Test mode: temperature rise method
Start temperature: 50° C.
Final temperature: 200° C.
Measurement interval: 1.0° C.
Rate of temperature rise: 4.0° C./min
Piston cross-sectional area: 1.000 $cm^2$
Test load (piston load): 10.0 kgf (0.9807 MPa)
Preheating time: 300 seconds
Die hole diameter: 1.0 mm
Die length: 1.0 mm <Measurement of Melting Point of Release Agent>

The melting points of indium and zinc are used to correct the temperature of the device detector, and the heat of fusion of indium is used to correct the amount of heat. Specifically, the sample is precisely weighed at about 2 mg and placed in an aluminum pan, and an empty aluminum pan is used as a reference to carry out measurement at a rate of temperature rise of 10° C./min within the measurement temperature range of 30° C. to 200° C. Note that in the measurement, the temperature is once raised to 200° C., then lowered to 30° C., and then raised again. The peak temperature of the maximum endothermic peak of the DSC curve in the temperature range of 30 to 200° C. during the second temperature rise process is defined as the melting point. There is no retention time after the temperature is raised to 200° C., and the temperature is lowered to 30° C. as soon as the temperature reaches 200° C.

<Method of Measuring Weight Average Particle Diameter (D4) of Toner Particle>

The weight average particle diameter (D4) of the toner particle is calculated by analyzing measurement data obtained from measurements with 25000 effective measurement channels, with use of a precision particle size distribution measuring device "Coulter Counter Multisizer 3" (registered trademark, manufactured by Beckman Coulter, Inc.) by virtue of the pore electrical resistance method equipped with a 100 m aperture tube, and the attached dedicated software "Beckman Coulter Multisizer 3 Version 3.51" (manufactured by Beckman Coulter, Inc.) for setting measurement conditions and analyzing measurement data.

As the electrolytic aqueous solution used for the measurements, it is possible to use special-grade sodium chloride dissolved in ion-exchanged water to a concentration of about 1% by mass, such as "ISOTON II" (manufactured by Beckman Coulter, Inc.).

Note that before carrying out measurements and analysis, the dedicated software is configured as follows.

In the "Change Standard Measurement Method (SOM) Screen" of the dedicated software, the total number of counts in the control mode is set to 50000 particles, the number of measurements is set to 1, and the Kd value is set to the value obtained using "Standard Particles 10.0 μm" (manufactured by Beckman Coulter, Inc.). By pressing the threshold/noise level measurement button, the threshold and noise level are automatically set. Also, the current is set to 1600 μA, the gain to 2, the electrolyte to ISOTON II, and the flash of aperture tube after measurement is checked.

In the "Pulse-to-Particle Diameter Conversion Setting Screen" of the dedicated software, the bin interval is set to logarithmic particle diameter, the particle diameter bin to 256 particle diameter bins, and the particle diameter range to 2 m or more and 60 m or less.

A specific measuring method is as follows.

(1) Put about 200 ml of the electrolytic aqueous solution into a 250 ml round-bottom glass beaker dedicated to Multisizer 3, set it on a sample stand, and stir the stirrer rod counterclockwise at 24 rotations/sec. Then, use the analysis software's "Aperture Flush" function to remove dirt and air bubbles inside the aperture tube.

(2) Put about 30 ml of the electrolytic aqueous solution in a 100 ml flat-bottom glass beaker, and add about 0.3 ml of a diluted solution obtained by diluting "Contaminon N" 3 times by mass with deionized water as a dispersant (a 10% by mass aqueous solution of a neutral detergent for washing precision measuring instruments with a pH of 7, composed of a nonionic surfactant, an anionic surfactant, and an organic builder, manufactured by Wako Pure Chemical Industries, Ltd.) therein.

(3) Build in 2 oscillators with an oscillation frequency of 50 kHz with a phase shift of 180 degrees, put a predetermined amount of ion-exchanged water in the water bath of an ultrasonic dispersion device with an electrical output of 120 W "Ultrasonic Dispension System Tetora 150" (manufactured by Nikkaki Bios Co. Ltd.), and add about 2 ml of Contaminon N to this water bath.

(4) Set the beaker of (2) in the beaker fixing hole of the ultrasonic dispersion device to operate the ultrasonic dispersion device. Then, adjust the height position of the beaker so as to maximize the resonance state of the liquid level of the electrolytic aqueous solution in the beaker.

(5) While irradiating the electrolytic aqueous solution in the beaker in (4) above with ultrasonic waves, add about 10 mg of toner little by little to the electrolytic aqueous solution and disperse it. Then, continue the ultrasonic dispersion treatment for another 60 seconds. Note that in the ultrasonic dispersion, the temperature of the water in the water bath is appropriately adjusted to 10° C. or higher and 40° C. or lower.

(6) To the round-bottom glass beaker of (1) set in the sample stand, add dropwise the electrolytic aqueous solution of (5) above having the toner dispersed therein using a pipette, and adjust the measured concentration to about 5%. Then, continue the measurement until the number of measured particles reaches 50000.

(7) Analyze the measurement data with the dedicated software attached to the apparatus, and calculate the weight average particle diameter (D4). Note that the "Average Diameter" on the analysis/volume statistical value (arithmetic mean) screen when graph/vol % is set on the dedicated software is the weight average particle diameter (D4).

<Method of Measuring Acid Value>

An acid value is the mass [mg] of potassium hydroxide required to neutralize the acid contained in 1 g of a sample. That is, the mass [mg] of potassium hydroxide required to neutralize the free fatty acids, resin acids, and the like contained in 1 g of a sample is called the acid value.

In the present invention, the acid value was measured in accordance with JIS K 0070-1992. Specifically, it was measured according to the following procedure.

(1) Preparation of Reagent

Phenolphthalein in an amount of 1.0 g was dissolved in 90 mL of ethyl alcohol (95% by volume), and ion-exchanged water was added thereto to a volume of 100 mL, and a phenolphthalein solution was obtained.

Special-grade potassium hydroxide in an amount of 7 g was dissolved in 5 mL of water, and ethyl alcohol (95% by volume) was added thereto to a volume of 1 L. It was placed in an alkali-resistant vessel and allowed to stand for 3 days so as not to come in contact with carbon dioxide gas or the like. After standing, it was filtered to obtain a potassium hydroxide solution. The resulting potassium hydroxide solution was stored in an alkali-resistant vessel. The factor of the potassium hydroxide solution was determined as follows. 25 mL of 0.1 mol/L hydrochloric acid was placed in an Erlenmeyer flask, several drops of the above phenolphthalein solution were added, titration was carried out with the above potassium hydroxide solution, and the amount of potassium hydroxide solution required for neutralization was used to determine the factor.

The above 0.1 mol/L hydrochloric acid used was prepared in accordance with JIS K 8001-1998.

(2) Operation (A) Main Test

The sample in an amount of 2.0 g was placed in a 200 mL Erlenmeyer flask and precisely weighed, and 100 mL of a mixed solution of toluene/ethanol (2:1) was added thereto, and the sample was dissolved over 5 hours. Then, several drops of the above phenolphthalein solution were added as an indicator, and the above potassium hydroxide solution was used to carry out titration. The end point of the titration was when the light red color of the indicator persisted for 30 seconds.

(B) Blank Test

The same titration as the above operation was carried out except that no sample was added (that is, only a mixed solution of toluene/ethanol (2:1) was used).

(3) Calculation of Acid Value

The obtained results were substituted into the following formula to calculate the acid value.

$$AV=[(B-A)\times f\times 5.61]/S$$

In the above formula, AV represents the acid value [mg KOH/g], A represents the amount [mL] of the potassium hydroxide solution added in the blank test, B represents the amount [mL] of the potassium hydroxide solution added in the main test, f represents the factor of the potassium hydroxide solution, and S represents the mass [g] of the sample.

Note that when amorphous resin B and amorphous resin B' were mixed and used in the present invention, 1 g of the mixed sample was used to measure the acid value.

<Method of Measuring Hydroxyl Value>

A hydroxyl value is a mg value of potassium hydroxide required to neutralize acetic acid bound to hydroxyl groups when 1 g of sample is acetylated. The hydroxyl value of the binder resin is measured in accordance with JIS K 0070-1992, and more specifically, it is measured according to the following procedure.

(1) Preparation of Reagent

Special-grade acetic anhydride in an amount of 25 g is placed in a 100 ml volumetric flask, and pyridine is added thereto to a total volume of 100 ml, and the mixture is shaken sufficiently to obtain an acetylation reagent. The resulting acetylation reagent is stored in a brown bottle so as not to come into contact with moisture, carbon dioxide gas, and the like.

Phenolphthalein in an amount of 1.0 g is dissolved in 90 ml of ethyl alcohol (95 vol %), and ion-exchanged water is added thereto to a volume of 100 ml, and a phenolphthalein solution is obtained.

Special-grade potassium hydroxide in an amount of 35 g is dissolved in 20 ml of water, and ethyl alcohol (95 vol %) is added thereto to a volume of 1 liter. It is placed in an alkali-resistant vessel and allowed to stand for 3 days so as not to come into contact with carbon dioxide gas or the like, and then filtered to obtain a potassium hydroxide solution. The resulting potassium hydroxide solution is stored in an alkali-resistant vessel. The factor of the potassium hydroxide solution is determined as follows. 25 ml of 0.5 mol/l hydrochloric acid is placed in an Erlenmeyer flask, several drops of the phenolphthalein solution are added, titration is carried out with the potassium hydroxide solution, and the amount of potassium hydroxide solution required for neutralization is used to determine the factor. The 0.5 mol/l hydrochloric acid used is prepared in accordance with JIS K 8001-1998.

(2) Operation (A) Main Test

The sample in an amount of 1.0 g is precisely weighed in a 200 ml round-bottomed flask, and 5.0 ml of the acetylation reagent is accurately added thereto using a whole pipette. At this time, if the sample is difficult to dissolve in the acetylation reagent, a small amount of special-grade toluene is added to dissolve it.

A small funnel is placed on the mouth of the flask, and the bottom of the flask is immersed at a depth of about 1 cm in a glycerin bath at about 97° C. and heated. At this time, in order to prevent the temperature of the neck of the flask from rising due to the heat of the bath, it is preferable to cover the base of the neck of the flask with a piece of cardboard with a round hole.

After 1 hour, the flask is removed from the glycerin bath and allowed to cool. After the cooling, 1 ml of water is added through the funnel and shaken to hydrolyze the acetic anhydride. For more complete hydrolysis, the flask is again heated in the glycerin bath for 10 minutes. After the cooling, the walls of the funnel and flask are washed with 5 ml of ethyl alcohol.

Several drops of the phenolphthalein solution are added as an indicator, and the potassium hydroxide solution is used to carry out titration. Note that the end point of the titration is when the light red color of the indicator persists for about 30 seconds.

(B) Blank Test

The same titration as the above operation is carried out except that no sample was used.

(3) the Obtained Results are Substituted into the Following Formula to Calculate the Hydroxyl Value:

$$A=[\{(B-C)\times 28.05\times f\}/S]+D,$$

where A: hydroxyl value (mg KOH/g), B: amount of potassium hydroxide solution added for blank test (ml), C: amount of potassium hydroxide solution added for main test (ml), f: factor of potassium hydroxide solution, S: sample (g), and D: acid value of sample (mg KOH/g).

<Measurement of BET Specific Surface Area of Inorganic Fine Particles>

The BET specific surface area of the inorganic fine particles was measured in accordance with JIS Z8830 (2001). The specific measuring method is as follows.

The measurement device used was an "Automatic Specific Surface Area & Porosity Analyzer TriStar 3000 (manufactured by Shimadzu Corporation)", which employs a constant volume gas adsorption method as a measurement method. Setting of measurement conditions and analysis of measurement data are carried out using the dedicated software "TriStar 3000 Version 4.00" attached to this device, and a vacuum pump, nitrogen gas pipe, and helium gas pipe are connected to the device. A value calculated by the BET multipoint method using nitrogen gas as an adsorption gas was defined as the BET specific surface area of the inorganic fine particles in the present invention.

Note that the BET specific surface area was calculated as follows.

First, nitrogen gas was adsorbed on the inorganic fine particles, and the equilibrium pressure P (Pa) in the sample cell and the amount of nitrogen adsorbed Va ($mol\cdot g^{-1}$) of the external additive at that time were measured. Then an adsorption isotherm was obtained, where the relative pressure Pr, which is the value obtained by dividing the equilibrium pressure P (Pa) in the sample cell by the saturated vapor pressure Po (Pa) of nitrogen, was used as the horizontal axis, and the amount of nitrogen adsorbed Va ($mol\cdot g^{-1}$) was used as the vertical axis. Next, a monomolecular layer adsorption amount Vm ($mol\cdot g^{-1}$), which is an adsorption amount necessary to form a monomolecular layer on the surface of the external additive, was obtained by applying the following BET formula:

$$Pr/Va(1-Pr)=1/(Vm\times C)+(C-1)\times Pr/(Vm\times C).$$

(Here, C is the BET parameter, which is a variable that varies depending on the type of the measurement sample, the type of the adsorbed gas, and the adsorption temperature.)

If the X-axis is Pr and the Y-axis is Pr/Va(1−Pr), the BET formula can be interpreted as a straight line with a slope of (C−1)/(Vm×C) and an intercept of 1/(Vm×C) (this straight line is called a BET plot).

Slope of straight line=(C−1)/(Vm×C)

Intercept of straight line=1/(Vm×C)

By plotting the measured values of Pr and the measured values of Pr/Va(1−Pr) on a graph and drawing a straight line by the method of least squares, the slope and intercept of the straight line can be calculated. Vm and C can be calculated by solving simultaneous equations for slope and intercept using these values.

Further, the calculated Vm and the cross-sectional area occupied by the nitrogen molecule (0.162 $nm^2$) are used to calculate the BET specific surface area S ($m^2/g$) of the inorganic fine particles according to the following formula:

$$S=Vm \times N \times 0.162 \times 10^{-18}.$$

(Here, N is Avogadro's number ($mol^{-1}$).)

The measurement using this device was carried out according to the "TriStar 3000 Instruction Manual V4.0" attached to the device, and specifically, the measurement was carried out according to the following procedure.

The package of a well-washed and dried dedicated glass sample cell (with a stem diameter of ⅜ inches and a volume of about 5 ml) was precisely weighed. Then, a funnel was used to put about 0.1 g of the external additive into the sample cell.

The sample cell containing the inorganic fine particles was set in a "Pretreatment Device VacPrep 061 (manufactured by Shimadzu Corporation)" in which a vacuum pump and a nitrogen gas pipe were connected, and vacuum degassing was continued at 23° C. for about 10 hours. During the vacuum deaeration, the valve was gradually degassed so that the inorganic fine particles would not be sucked into the vacuum pump. The pressure in the cell gradually decreased with degassing, and finally reached about 0.4 Pa (about 3 mTorr). After the vacuum degassing was completed, nitrogen gas was gradually injected to return the inside of the sample cell to atmospheric pressure, and the sample cell was removed from the pretreatment device. Then, the mass of this sample cell was precisely weighed, and the exact mass of the external additive was calculated from the difference from the package. Note that at this time, the sample cell was capped with a rubber stopper during weighing so that the external additive in the sample cell would not be contaminated with moisture in the atmosphere or the like.

Next, a dedicated "isothermal jacket" was attached to the stem portion of the sample cell containing the inorganic fine particles. Then, a dedicated filler rod was inserted into this sample cell, and the sample cell was set in the analysis port of the device. Note that the isothermal jacket is a cylindrical member with a porous inner surface and an impermeable outer surface that can suck up liquid nitrogen to a certain level by capillary action.

A measurement of the free space of the sample cell containing the connecting equipment was then carried out. The free space was calculated as follows. The volume of the sample cell was measured using helium gas at 23° C., and then the volume of the sample cell after cooling the sample cell with liquid nitrogen was similarly measured using helium gas. The free space was calculated by conversion from the difference between these volumes. In addition, the saturated vapor pressure Po (Pa) of nitrogen is separately and automatically measured using a Po tube built into the device.

Next, the inside of the sample cell was vacuum degassed, and then the sample cell was cooled with liquid nitrogen while vacuum degassing was continued. Thereafter, nitrogen gas was introduced stepwise into the sample cell to cause the toner to adsorb nitrogen molecules. At this time, since the adsorption isotherm can be obtained by measuring the equilibrium pressure P (Pa) at any time, the adsorption isotherm was converted into a BET plot. Note that the points of the relative pressure Pr for data collection were set to a total of 6 points, 0.05, 0.10, 0.15, 0.20, 0.25, and 0.30. A straight line was drawn on the obtained measurement data by the method of least squares, and Vm was calculated from the slope and intercept of the straight line. Furthermore, this Vm value was used to calculate the BET specific surface area of the inorganic fine particles as described above.

Configuration Included in Embodiments of Present Invention

The disclosure of embodiments includes the following configurations.

(Configuration 1) a Toner Including:

- a toner particle containing a binder resin and a crystalline polyester, in which
- when differential scanning calorimetry (DSC) of the toner undergoes the processes of (i) raising the temperature to 180° C. at a rate of 10° C./min, (ii) then cooling the toner from 180° C. to 25° C. at a rate of 10° C./min, (iii) thereafter cooling the toner from 25° C. to 15° C. at a rate of 3° C./min, and (iv) raising the temperature of the toner again to 180° C. at a rate of 10° C./min,
- an exothermic amount P1 of a peak derived from the crystalline polyester present at 40° C. or higher and 80° C. or lower in the process of cooling the toner at a rate of 10° C./min is 1.00 J/g or less,
- an exothermic amount P2 of a crystallization peak derived from the crystalline polyester present in the process of cooling the toner at a rate of 3° C./min is 0.10 J/g or more, and
- when a sum of endothermic amounts of the endothermic peaks present at 40° C. or higher observed in the second temperature rise process in DSC of the toner is denoted by P3 (J/g), and a sum of exothermic amounts of the exothermic peaks present at 40° C. or higher observed in the process of cooling the toner at a rate of 10° C./min is denoted by P4 (J/g), the following formula (1) is satisfied:

$$2.0 \leq P3-P4 \leq 10.0. \quad \text{Formula (1)}$$

(Configuration 2) The toner according to Configuration 1, in which the exothermic amount P1 of the peak derived from the crystalline polyester present at 40° C. or higher and 80° C. or lower in the process of cooling the toner at a rate of 10° C./min is 0.50 J/g or less.

(Configuration 3) The toner according to Configuration 1 or 2, in which a ratio of the crystalline polyester to the binder resin is 8.0% by mass or more and 15.0% by mass or less.

(Configuration 4) The toner according to any one of Configurations 1 to 3, in which the toner contains a hydrocarbon-based wax, and a difference between a melting point T1 (° C.) of the hydrocarbon-based wax and a melting point T2 (° C.) of the crystalline polyester in the toner satisfies the following formula (2):

$$2 \leq T1-T2 \leq 10. \quad \text{Formula (2)}$$

(Configuration 5) The toner according to any one of Configurations 1 to 4, in which the binder resin contains amorphous resin A, amorphous resin B, and amorphous resin C, and when an SP value $[(J/cm^3)^{0.5}]$ of the amorphous resin A is denoted by SP1, an SP value $[(J/cm^3)^{0.5}]$ of the amorphous resin B is denoted by SP2, and an SP value $[(J/cm^3)^{0.5}]$ of the amorphous resin C is denoted by SP3, and when an SP value $[(J/cm^3)^{0.5}]$ of the crystalline polyester is denoted by SP4, the following formulas (3) to (5) are satisfied:

$$2.00 \leq SP1-SP4 \leq 2.90 \quad \text{Formula (3)}$$

$$0.20 \leq SP2-SP1 \leq 0.60 \quad \text{Formula (4)}$$

$$0.20 \leq SP3-SP2 \leq 0.60. \quad \text{Formula (5)}$$

temperature shown in Table 1. Then, the temperature was lowered to stop the reaction and obtain amorphous polyester resin A1. Table 1 shows the physical properties thereof.

Production Examples of Amorphous Resins A2 to A4

Amorphous resins A2 to A4 were obtained in the same manner as in the production example of amorphous resin A1, except that the monomers used were changed as shown in Table 1. Table 1 shows the compositions and physical properties of the resulting amorphous resins A2 to A4.

TABLE 1

| | Alcohol | | Acid | | | | | | | | |
|---|---|---|---|---|---|---|---|---|---|---|---|
| Amorphous Resin No | BPA-PO (2.2) | BPA-PO (2.5) | Terephthalic Acid | Adipic Acid | Trimellitic Anhydride | Molecular Weight Mw | Softening Point Tm (° C.) | Glass Transition point Tg (° C.) | Acid Value (mg KOH/g) | Hydroxyl Value (mg KOH/g) | SP Value |
| Amorphous Resin A1 | 52.0 mol % | | 28.0 mol % | 10.0 mol % | 10.0 mol % | 100000 | 150 | 60 | 24 | 2.8 | 11.00 |
| Amorphous Resin A2 | 52.0 mol % | | 34.0 mol % | 4.0 mol % | 10.0 mol % | 100000 | 148 | 61 | 23 | 4 | 11.07 |
| Amorphous Resin A3 | | 52.0 mol % | 26.0 mol % | 12.0 mol % | 10.0 mol % | 100000 | 150 | 59 | 25 | 3 | 10.92 |
| Amorphous Resin A4 | | 53.0 mol % | 25.0 mol % | 12.0 mol % | 10.0 mol % | 100000 | 147 | 58 | 20 | 5 | 10.87 |

(Configuration 6) A two-component developer including: a toner and a magnetic carrier, in which the toner is the toner according to any one of Configurations 1 to 5.

EXAMPLES

The present invention is described below with reference to Examples and the like. Note that the description regarding these Examples does not limit the technical scope of the present invention.

Production Example of Amorphous Resin A1

Bisphenol A propylene oxide adduct (average number of moles added was 2.2 mol): 69.7 parts by mass (52.0 mol %)

Terephthalic acid: 17.5 parts by mass (28.0 mol %)

Adipic acid: 5.5 parts by mass (10.0 mol %)

Titanium tetrabutoxide (esterification catalyst): 0.5 parts by mass

The above materials were weighed into a reactor equipped with a condenser, stirrer, nitrogen introduction pipe, and thermocouple.

Next, after the inside of the flask was replaced with nitrogen gas, the temperature was gradually raised while stirring, and the reaction was carried out for 2 hours while stirring at a temperature of 200° C.

Further, the pressure inside the reactor was lowered to 8.3 kPa and maintained for 1 hour, then cooled to 160° C. and returned to atmospheric pressure.

Trimellitic anhydride: 7.2 parts by mass (10.0 mol %)

After that, the above materials were added, the pressure in the reactor was lowered to 8.3 kPa, the reaction was allowed to proceed while the temperature was maintained at 200° C., and it was confirmed that the softening point reached the Abbreviations in Table 1 are as follows:

BPA-PO (2.2): propylene oxide adduct of bisphenol A (average number of moles added was 2.2 mol)

BPA-PO (2.5): propylene oxide adduct of bisphenol A (average number of moles added was 2.5 mol)

Production Example of Amorphous Resin B1

Bisphenol A propylene oxide adduct (average number of moles added was 2.2 mol): 73.2 parts by mass (56.0 mol %)

Terephthalic acid: 26.6 parts by mass (43.7 mol %)

Trimellitic anhydride: 0.2 parts by mass (0.3 mol %)

Titanium tetrabutoxide (esterification catalyst): 0.5 parts by mass

The above materials were weighed into a reactor equipped with a condenser, stirrer, nitrogen introduction pipe, and thermocouple.

Next, after the inside of the flask was replaced with nitrogen gas, the temperature was gradually raised while stirring, and the reaction was carried out for 3 hours while stirring at a temperature of 200° C. After that, the pressure in the reactor was lowered to 8.3 kPa, the reaction was allowed to proceed while the temperature was maintained at 200° C., and it was confirmed that the softening point reached the temperature shown in Table 2. Then, the temperature was lowered to stop the reaction and obtain amorphous resin B1. Table 2 shows the physical properties thereof.

Production Examples of Amorphous Resins B2 and B3

Amorphous resins B2 and B3 were obtained in the same manner as in the production example of amorphous resin B1, except that the monomers used were changed as shown in Table 2. Table 2 shows the compositions and physical properties of the resulting amorphous resins B2 and B3.

TABLE 2

| Amorphous Resin No. | Alcohol BPA-PO (2.2) | Acid Terephthalic Acid | Acid Adipic Acid | Acid Trimellitic Anhydride | Molecular Weight Mw | Softening Point Tm (° C.) | Glass Transition point Tg (° C.) | Acid Value (mg KOH/g) | Hydroxyl Value (mg KOH/g) | SP Value |
|---|---|---|---|---|---|---|---|---|---|---|
| Amorphous Resin B1 | 56.0 mol % | 43.7 mol % | — | 0.3 mol % | 5000 | 96 | 56 | 5.0 | 58.0 | 22.87 |
| Amorphous Resin B2 | 56.0 mol % | 28.7 mol % | 15.0 mol % | 0.3 mol % | 5000 | 92 | 54 | 4.0 | 57.0 | 22.54 |
| Amorphous Resin B3 | 56.0 mol % | 33.7 mol % | 10.0 mol % | 0.3 mol % | 5000 | 93 | 55 | 5.0 | 56.0 | 22.64 |

Abbreviations in Table 2 are as follows:

BPA-PO (2.2): propylene oxide adduct of bisphenol A (average number of moles added was 2.2 mol)

Production Example of Amorphous Resin C1

Bisphenol A propylene oxide adduct (average number of moles added was 2.2 mol): 39.8 parts by mass (26.4 mol %)

Bisphenol A ethylene oxide adduct (average number of moles added was 2.2 mol): 24.2 parts by mass (17.6 mol %)

Ethylene glycol: 1.9 parts by mass (7.5 mol %)

Fumaric acid: 0.2 parts by mass (0.5 mol %)

Terephthalic acid: 30.9 parts by mass (44.0 mol %)

Myristic acid: 2.4 parts by mass (2.5 mol %)

Tin(II) 2-ethylhexanoate: 0.5 parts by mass

The above materials were weighed into a reactor equipped with a condenser, stirrer, nitrogen introduction pipe, and thermocouple.

Next, after the inside of the flask was replaced with nitrogen gas, the temperature was gradually raised while stirring, and the reaction was carried out for 4 hours while stirring at a temperature of 200° C.

Further, the pressure inside the reactor was lowered to 8.3 kPa and maintained for 1 hour, then cooled to 160° C. and returned to atmospheric pressure.

Then, after adding 0.5 parts by mass of dicumyl peroxide, 0.6 parts by mass (1.5 mol %) of methyl methacrylate was added dropwise over 1 hour while stirring. After that, the pressure in the reactor was lowered to 8.3 kPa, the reaction was allowed to proceed while the temperature was maintained at 200° C., and it was confirmed that the softening point reached the temperature shown in Table 3. Then, the temperature was lowered to stop the reaction and obtain amorphous resin C1. Table 3 shows the physical properties thereof.

Production Examples of Amorphous Resins C2 to C4

Amorphous resins C2 to C4 were obtained in the same manner as in the production example of amorphous resin C1, except that the monomers used were changed as shown in Table 3. Table 3 shows the compositions and physical properties of the resulting amorphous resins C2 to C4.

TABLE 3

| Amorphous Resin No. | Alcohol BPA-PO (2.2) | Alcohol BPA-PO (2.2) | Alcohol Ethylene Glycol | Acid Terephthalic Acid | Acid Fumaric Acid | Acid Myristic Acid | Acrylic Monomer Methyl Methacrylate |
|---|---|---|---|---|---|---|---|
| Amorphous Resin C1 | 26.4 mol % | 17.6 mol % | 7.5 mol % | 44.0 mol % | 0.5 mol % | 2.5 mol % | 1.5 mol % |
| Amorphous Resin C2 | 13.2 mol % | 30.8 mol % | 7.5 mol % | 44.0 mol % | 0.5 mol % | 2.5 mol % | 1.5 mol % |
| Amorphous Resin C3 | 30.9 mol % | 20.6 mol % | — | 44.0 mol % | 0.5 mol % | 2.5 mol % | 1.5 mol % |
| Amorphous Resin C4 | 44.0 mol % | — | 7.5 mol % | 44.0 mol % | 0.5 mol % | 2.5 mol % | 1.5 mol % |

| Amorphous Resin No. | Molecular Weight Mw | Softening Point Tm (° C.) | Glass Transition point Tg (° C.) | Acid Value (mg KOH/g) | Hydroxyl Value (mg KOH/g) | SP Value |
|---|---|---|---|---|---|---|
| Amorphous Resin C1 | 20000 | 106 | 55 | 4.0 | 47.0 | 23.13 |
| Amorphous Resin C2 | 19000 | 105 | 54 | 5.0 | 47.0 | 23.34 |
| Amorphous Resin C3 | 24000 | 109 | 58 | 6.0 | 50.0 | 23.05 |
| Amorphous Resin C4 | 18000 | 104 | 54 | 5.0 | 48.0 | 23.58 |

Abbreviations in Table 3 are as follows.

BPA-PO (2.2): propylene oxide adduct of bisphenol A (average number of moles added was 2.2 mol)

BPA-EO: ethylene oxide adduct of bisphenol A (average number of moles added was 2.2 mol)

Production Example of Crystalline Polyester D1

Ethylene glycol: 17.8 parts by mass (49.0 mol %)

Tetradecanedioic acid: 71.9 parts by mass (46.0 mol %)

Behenic acid: 10.3 parts by mass (5.0 mol %)

Tin(II) 2-ethylhexanoate: 0.5 parts by mass

The above materials were weighed into a reactor equipped with a condenser, stirrer, nitrogen introduction pipe, and thermocouple.

After the inside of the flask was replaced with nitrogen gas, the temperature was gradually raised while stirring, and the reaction was carried out for 3 hours while stirring at a temperature of 140° C.

After that, the pressure in the reactor was lowered to 8.3 kPa, and reaction was carried out for 4 hours while maintaining the temperature at 200° C. to obtain crystalline polyester D1 as a crystalline resin. Table 4 shows the physical properties thereof.

Production Examples of Crystalline Polyesters D2 to D7

Crystalline polyesters D2 to D7 were obtained in the same manner as in the production example of crystalline polyester D1, except that the monomers used were changed as shown in Table 4. Table 4 shows the compositions and physical properties of the resulting crystalline polyesters D2 to D7.

Methacrylic acid: 5.0 parts by mass (0.06 mol; 6.8 mol % based on the total number of moles of the constituent monomers)

Xylene: 10.0 parts by mass

Di-t-butyl peroxy-hexahydro terephthalate: 0.5 parts by mass

After that, the above materials were added dropwise over 3 hours, and the mixture was further stirred for 30 minutes. Then, the solvent was distilled off to obtain wax dispersant E having a structure in which vinyl-based resin components and hydrocarbon compounds reacted. The resulting wax dispersant E had a peak molecular weight Mp of 6000 and a softening point of 125° C.

TABLE 4

| | Alcohol | | | Acid | | |
|---|---|---|---|---|---|---|
| Crystalline Resin No | Butanediol | Decanediol | Ethylene Glycol | Decanedioic Acid | Tetradecanedioic Acid | Behenic Acid |
| Crystalline Resin D1 | — | — | 49.0 mol % | — | 46.0 mol % | 5.0 mol % |
| Crystalline Resin D2 | — | — | 47.0 mol % | — | 39.0 mol % | 14.0 mol % |
| Crystalline Resin D3 | 48.0 mol % | — | — | — | 42.0 mol % | — |
| Crystalline Resin D4 | 48.0 mol % | — | — | — | 38.0 mol % | — |
| Crystalline Resin D5 | — | — | 52.0 mol % | — | 46.0 mol % | 2.0 mol % |
| Crystalline Resin D6 | — | 54.0 mol % | — | — | 44.0 mol % | 2.0 mol % |
| Crystalline Resin D7 | 47.0 mol % | — | — | 45.0 mol % | — | — |
| | Crystalline Resin No | Acid Lauric Acid | Molecular Weight Mw | Acid Value (mg KOH/g | Hydroxyl Value (mg KOHg) | SP Value |
| | Crystalline Resin D1 | — | 19000 | 5.0 | 7.0 | 19.92 |
| | Crystalline Resin D2 | — | 10000 | 2.0 | 7.0 | 19.47 |
| | Crystalline Resin D3 | 10.0 mol % | 13000 | 4.0 | 7.0 | 19.88 |
| | Crystalline Resin D4 | 14.0 mol % | 10000 | 4.0 | 11.0 | 19.78 |
| | Crystalline Resin D5 | — | 15000 | 4.0 | 16.0 | 20.21 |
| | Crystalline Resin D6 | — | 18000 | 3.0 | 22.0 | 19.37 |
| | Crystalline Resin D7 | 8.0 mol % | 18000 | 10.0 | 6.0 | 20.27 |

<Release Agents 1 and 2>

The release agents used in the present invention were Fischer-Tropsch waxes. Among them, the peak temperature of the maximum endothermic peak of the release agent 1 was 90° C. and the acid value thereof was 0, and the peak temperature of the maximum endothermic peak of the release agent 2 was 87° C. and the acid value was thereof 0.

Production Example of Wax Dispersant E

Low-molecular-weight polypropylene (Viscol 660P manufactured by Sanyo Chemical Industries, Ltd.): 10.0 parts by mass (0.02 mol; 2.4 mol % based on the total number of moles of the constituent monomers)

Xylene: 25.0 parts by mass

The above materials were weighed into a reactor equipped with a condenser, stirrer, nitrogen introduction pipe, and thermocouple.

Next, after the inside of the flask was replaced with nitrogen gas, the temperature was gradually raised to 175° C. while stirring.

Styrene: 68.0 parts by mass (0.65 mol; 76.4 mol % based on the total number of moles of the constituent monomers)

Cyclohexyl methacrylate: 5.0 parts by mass (0.03 mol; 3.5 mol % based on the total number of moles of the constituent monomers)

Butyl acrylate: 12.0 parts by mass (0.09 mol; 11.0 mol % based on the total number of moles of the constituent monomers)

Production Example of Toner 1

| | |
|---|---|
| Amorphous resin A1 | 25 parts by mass |
| Amorphous resin B1 | 20 parts by mass |
| Amorphous resin C1 | 45 parts by mass |
| Crystalline polyester D1 | 10 parts by mass |
| Wax dispersant E | 5 parts by mass |
| Release agent 1 | 5 parts by mass |
| C.I. Pigment Blue 15:3 | 7 parts by mass |

A Henschel mixer (Model FM-75, manufactured by Mitsui Kozan) was used to mix the above materials at a rotation speed of 20 $s^{-1}$ for a rotation time of 5 minutes, and the mixture was then kneaded using a twin-screw kneader set at a temperature of 130° C. (Model PCM-30, manufactured by Ikegai Corp.). The resulting kneaded product was cooled and coarsely pulverized to 1 mm or less using a hammer mill to obtain a coarsely pulverized product. The resulting coarsely pulverized product was finely pulverized using a mechanical pulverizer (T-250, manufactured by Turbo Kogyo). Further, classification was carried out using Faculty F-300 (manufactured by Hosokawa Micron Corporation) to obtain a toner particle 1.

A precision particle size distribution measuring device "Coulter Counter Multisizer 3" (registered trademark, manufactured by Beckman Coulter, Inc.) was used to measure the weight average particle diameter (D4) of a toner particle 1, which was found to be 6.5 μm.

To 100 parts by mass of the resulting toner particle 1, 1.0 parts by mass of hydrophobic silica (BET: 200 $m^2/g$) surface-treated with hexamethyldisilazane and 1.0 parts by mass of titanium oxide fine particles (BET: 80 $m^2/g$) surface-treated with isobutyltrimethoxysilane were mixed using a Henschel mixer (Model FM-75, manufactured by Mitsui Miike Kakoki) at a rotation speed of 30 $s^{-1}$ for a rotation time of 10 minutes to obtain toner 1.

Manufacturing Examples of Toners 2 to 24

Toners 2 to 24 were obtained in the same manner as in the production example of toner 1, except that amorphous resin A, amorphous resin B, amorphous resin C, crystalline polyester D, release agents, and the mass parts thereof were changed as shown in Table 5. Note that for Toner 20, Toner 23, and Toner 24, T2 could not be confirmed.

TABLE 5-1

| | Amorphous Resin | | | | | | | | | Crystalline Polyester D | | | | | | |
|---|---|---|---|---|---|---|---|---|---|---|---|---|---|---|---|---|
| | | Parts Added (Parts by | SP | | Parts Added (Parts by | SP | | Parts Added (Parts by | SP | | Parts Added (Parts by | SP | Release Agent | SP Value Difference | | |
| Toner No. | Type | Mass) | Value | Type | Mass) | Value | Type | Mass) | Value | Type | Mass) | Value | Type | SP1-SP4 | SP2-SP1 | SP3-SP2 |
| Toner 1 | Amorphous Resin A1 | 25.0 | 22.50 | Amorphous Resin B1 | 20.0 | 22.87 | Amorphous Resin C1 | 45.0 | 23.13 | Crystalline Polyester D1 | 10.0 | 19.92 | Release Agent 1 | 2.58 | 0.37 | 0.26 |
| Toner 2 | Amorphous Resin A1 | 25.0 | 22.50 | Amorphous Resin B1 | 45.0 | 22.87 | Amorphous Resin C1 | 20.0 | 23.13 | Crystalline Polyester D1 | 10.0 | 19.92 | Release Agent 1 | 2.58 | 0.37 | 0.26 |
| Toner 3 | Amorphous Resin A1 | 25.0 | 22.50 | Amorphous Resin B1 | 20.0 | 22.87 | Amorphous Resin C1 | 45.0 | 23.13 | Crystalline Polyester D1 | 10.0 | 19.92 | Release Agent 1 | 2.58 | 0.37 | 0.26 |
| Toner 4 | Amorphous Resin A2 | 25.0 | 22.64 | Amorphous Resin B1 | 20.0 | 22.87 | Amorphous Resin C1 | 45.0 | 23.13 | Crystalline Polyester D1 | 10.0 | 19.92 | Release Agent 1 | 2.72 | 0.23 | 0.26 |
| Toner 5 | Amorphous Resin A3 | 25.0 | 22.30 | Amorphous Resin B1 | 20.0 | 22.87 | Amorphous Resin C1 | 45.0 | 23.13 | Crystalline Polyester D1 | 10.0 | 19.92 | Release Agent 1 | 2.38 | 0.57 | 0.26 |
| Toner 6 | Amorphous Resin A3 | 25.0 | 22.30 | Amorphous Resin B2 | 20.0 | 22.54 | Amorphous Resin C1 | 45.0 | 23.13 | Crystalline Polyester D1 | 10.0 | 19.92 | Release Agent 1 | 2.38 | 0.24 | 0.59 |
| Toner 7 | Amorphous Resin A3 | 25.0 | 22.30 | Amorphous Resin B2 | 200 | 22.54 | Amorphous Resin C1 | 45.0 | 23.13 | Crystalline Polyester D2 | 10.0 | 19.47 | Release Agent 1 | 2.83 | 0.24 | 0.59 |
| Toner 8 | Amorphous Resin A3 | 25.0 | 22.30 | Amorphous Resin B2 | 20.0 | 22.54 | Amorphous Resin C1 | 45.0 | 23.13 | Crystalline Polyester D3 | 10.0 | 19.88 | Release Agent 1 | 2.42 | 0.24 | 0.59 |
| Toner 9 | Amorphous Resin A1 | 25.0 | 22.50 | Amorphous Resin B1 | 20.0 | 22.87 | Amorphous Resin C1 | 45.0 | 23.13 | Crystalline Polyester D1 | 10.0 | 19.92 | Release Agn 2 | 2.58 | 0.37 | 0.26 |
| Toner 10 | Amorphous Resin A3 | 25.0 | 22.30 | Amorphous Resin B2 | 20.0 | 22.54 | Amorphous Resin C1 | 45.0 | 23.13 | Crystalline Polyester D4 | 10.0 | 19.78 | Release Agent 1 | 2.52 | 0.24 | 0.59 |
| Toner 11 | Amorphous Resin A2 | 25.0 | 22.64 | Amorphous Resin B1 | 20.0 | 22.87 | Amorphous Resin C1 | 45.0 | 23.13 | Crystalline Polyester D1 | 10.0 | 19.92 | Release Agent 1 | 2.72 | 0.23 | 1.26 |
| Toner 12 | Amorphous Resin A1 | 25.0 | 22.50 | Amorphous Resin B1 | 20.0 | 22.87 | Amorphous Resin C1 | 47.0 | 23.13 | Crystalline Polyester D1 | 8.0 | 19.92 | Release Agent 1 | 2.58 | 0.37 | 0.26 |
| Toner 13 | Amorphous Resin A1 | 25.0 | 22.50 | Amorphous Resin B1 | 20.0 | 22.87 | Amorphous Resin C1 | 40.0 | 23.13 | Crystalline Polyester D1 | 15.0 | 19.92 | Release Agent 1 | 2.58 | 0.37 | 0.26 |
| Toner 14 | Amorphous Resin A3 | 25.0 | 22.30 | Amorphous Resin B1 | 20.0 | 22.87 | Amorphous Resin C1 | 45.0 | 23.13 | Crystalline Polyester D5 | 10.0 | 20.21 | Release Agent 1 | 2.09 | 0.57 | 0.26 |
| Toner 15 | Amorphous Resin A3 | 25.0 | 22.30 | Amorphous Resin B2 | 20.0 | 22.54 | Amorphous Resin C2 | 45.0 | 23.34 | Crystalline Polyester D2 | 10.0 | 19.47 | Release Agent 1 | 2.83 | 0.24 | 0.80 |
| Toner 16 | Amorphous Resin A1 | 25.0 | 22.50 | Amorphous Resin B3 | 20.0 | 22.64 | Amorphous Resin C1 | 45.0 | 23.13 | Crystalline Polyester D1 | 10.0 | 19.92 | Release Agent 1 | 2.58 | 0.14 | 0.49 |
| Toner 17 | Amorphous Resin A4 | 25.0 | 22.23 | Amorphous Resin B1 | 20.0 | 22.87 | Amorphous Resin C1 | 45.0 | 23.13 | Crystalline Polyester D1 | 10.0 | 19.92 | Release Agent 1 | 2.31 | 0.64 | 0.26 |
| Toner 18 | Amorphous Resin A1 | 25.0 | 22.50 | Amorphous Resin B1 | 20.0 | 22.87 | Amorphous Resin C3 | 45.0 | 23.05 | Crystalline Polyester D1 | 10.0 | 19.92 | Release Agent 1 | 2.58 | 0.37 | 0.18 |
| Toner 19 | Amorphous Resin A3 | 25.0 | 22.30 | Amorphous Resin B2 | 20.0 | 22.54 | Amorphous Resin C4 | 45.0 | 23.58 | Crystalline Polyester D2 | 10.0 | 19.47 | Release Agent 1 | 2.83 | 0.24 | 1.04 |
| Toner 20 | Amorphous Resin A1 | 25.0 | 22.50 | Amorphous Resin B1 | 20.0 | 22.87 | Amorphous Resin C1 | 49.0 | 23.13 | Crystalline Polyester D1 | 6.0 | 19.92 | Release Agent 1 | 2.58 | 0.37 | 0.26 |
| Toner 21 | Amorphous Resin A1 | 25.0 | 22.50 | Amorphous Resin B1 | 17.0 | 22.87 | Amorphous Resin C1 | 40.0 | 23.13 | Crystalline Polyester D1 | 18.0 | 19.92 | Release Agent 1 | 2.58 | 0.37 | 0.26 |
| Toner 22 | Amorphous Resin A3 | 25.0 | 22.30 | Amorphous Resin B1 | 20.0 | 22.87 | Amorphous Resin C1 | 45.0 | 23.13 | Crystalline Polyester D6 | 10.0 | 19.37 | Release Agent | 2.93 | 0.57 | 0.26 |

TABLE 5-1-continued

| | Amorphous Resin | | | | | | | | | Crystalline Polyester D | | | | SP Value Difference | | |
|---|---|---|---|---|---|---|---|---|---|---|---|---|---|---|---|---|
| Toner No. | Type | Parts Added (Parts by Mass) | SP Value | Type | Parts Added (Parts by Mass) | SP Value | Type | Parts Added (Parts by Mass) | SP Value | Type | Parts Added (Parts by Mass) | SP Value | Release Agent Type | SP1-SP4 | SP2-SP1 | SP3-SP2 |
| Toner 23 | Amorphous Resin A4 | 25.0 | 22.23 | Amorphous Resin B1 | 20.0 | 22.87 | Amorphous Resin C1 | 45.0 | 23.13 | Crystalline Polyester D7 | 10.0 | 20.27 | 1<br>Release Agent 1 | 1.96 | 0.64 | 0.26 |
| Toner 24 | Amorphous Resin A1 | 25.0 | 22.50 | Amorphous Resin B1 | 55.0 | 22.87 | — | — | — | Crystalline Polyester D1 | 10.0 | 19.92 | Release Agent 1 | 2.58 | 0.37 | — |

TABLE 5-2

| | DSC | | | | | | | |
|---|---|---|---|---|---|---|---|---|
| Toner No. | T1 | T2 | T1-T2 | P1 | P2 | P3 | P4 | P3-P4 |
| Toner 1 | 89 | 84 | 5 | 0.12 | 0.20 | 13.5 | 10.0 | 3.5 |
| Toner 2 | 89 | 84 | 5 | 0.02 | 0.11 | 12.8 | 10.0 | 2.8 |
| Toner 3 | 89 | 84 | 5 | 0.18 | 0.18 | 13.3 | 10.0 | 3.3 |
| Toner 4 | 89 | 85 | 4 | 0.25 | 0.21 | 13.7 | 10.1 | 3.6 |
| Toner 5 | 89 | 84 | 5 | 0.10 | 0.18 | 13.6 | 10.0 | 3.6 |
| Toner 6 | 89 | 84 | 5 | 0.10 | 0.14 | 13.6 | 10.0 | 3.6 |
| Toner 7 | 89 | 82 | 7 | 0.10 | 0.14 | 13.6 | 10.0 | 3.6 |
| Toner 8 | 89 | 80 | 9 | 0.05 | 0.12 | 12.6 | 10.0 | 2.6 |
| Toner 9 | 86 | 84 | 2 | 0.40 | 0.11 | 12.5 | 10.3 | 2.2 |
| Toner 10 | 89 | 78 | 11 | 0.04 | 0.11 | 12.4 | 10.0 | 2.4 |
| Toner 11 | 86 | 85 | 1 | 0.49 | 0.11 | 12.7 | 10.5 | 2.2 |
| Toner 12 | 89 | 84 | 5 | 0.08 | 0.11 | 12.1 | 10.0 | 2.1 |
| Toner 13 | 89 | 84 | 5 | 0.95 | 0.20 | 18.5 | 11.5 | 7.0 |
| Toner 14 | 89 | 85 | 4 | 0.12 | 0.10 | 12.2 | 10.0 | 2.2 |
| Toner 15 | 89 | 82 | 7 | 0.85 | 0.11 | 14.7 | 10.7 | 4.0 |
| Toner 16 | 89 | 84 | 5 | 0.08 | 0.14 | 13.1 | 10.0 | 3.1 |
| Toner 17 | 89 | 84 | 5 | 0.10 | 0.16 | 13.6 | 10.0 | 3.6 |
| Toner 18 | 89 | 84 | 5 | 0.07 | 0.13 | 12.4 | 10.0 | 2.4 |
| Toner 19 | 89 | 82 | 7 | 0.98 | 0.06 | 12.7 | 10.7 | 2.0 |
| Toner 20 | 89 | — | — | 0.10 | 0.05 | 10.5 | 10.0 | 0.5 |
| Toner 21 | 89 | 85 | 4 | 1.50 | 0.02 | 18.5 | 11.5 | 7.0 |
| Toner 22 | 89 | 80 | 9 | 9.00 | 0.00 | 19.4 | 19.0 | 0.4 |
| Toner 23 | 89 | — | — | 0.00 | 0.00 | 10.1 | 10.0 | 0.1 |
| Toner 24 | 89 | — | — | 0.00 | 0.00 | 10.3 | 10.0 | 0.3 |

Production Example of Magnetic Core Particles 1

Step 1 (Weighing/Mixing Step):

| | |
|---|---|
| $Fe_2O_3$ | 62.7 parts by mass |
| $MnCO_3$ | 29.5 parts by mass |
| $Mg(OH)_2$ | 6.8 parts by mass |
| $SrCO_3$ | 1.0 parts by mass. |

The ferrite raw materials were weighed so as to obtain the above composition ratio. After that, they were pulverized and mixed for 5 hours in a dry vibration mill using stainless beads having a diameter of ⅛ inches.

Step 2 (Pre-Calcination Step):

The pulverized product thus obtained was formed into pellets of about 1 mm square with a roller compactor. The pellets were passed through a vibrating sieve with an opening of 3 mm to remove coarse powder, and then through a vibrating sieve with an opening of 0.5 mm to remove fine powder, and thereafter calcined at a temperature of 1000° C. for 4 hours in a nitrogen atmosphere (oxygen concentration: 0.01% by volume) using a burner-type firing furnace to produce pre-calcined ferrite. The composition of the resulting pre-calcined ferrite is as follows:

$$(MnO)_a(MgO)_b(SrO)_c(Fe_2O_3)_d$$

In the above formula, a=0.257, b=0.117, c=0.007, and d=0.393.

Step 3 (Pulverization Step):

A crusher was used for pulverization to about 0.3 mm, and then 30 parts by mass of water was added to 100 parts by mass of the pre-calcined ferrite using zirconia beads with a diameter of ⅛ inches, which was pulverized with a wet ball mill for 1 hour. The slurry was pulverized for 4 hours in a wet ball mill using alumina beads with a diameter of 1/16 inches to obtain a ferrite slurry (finely pulverized pre-calcined ferrite).

Step 4 (Granulation Step):

To the ferrite slurry, 1.0 parts by mass of ammonium polycarboxylate as a dispersant and 2.0 parts by mass of polyvinyl alcohol as a binder, based on 100 parts by mass of the pre-calcined ferrite, were added, and the mixture was granulated into spherical particles with a spray dryer (manufacturer: Ohkawara Kakohki Co., Ltd.). The resulting particles were subjected to particle size adjustment, and then heated at 650° C. for 2 hours using a rotary kiln to remove the organic components of the dispersant and binder.

Step 5 (Calcination Step):

In order to control the calcination atmosphere, the spherical particles were heated in an electric furnace under a nitrogen atmosphere (oxygen concentration 1.00% by volume) from room temperature to 1300° C. in 2 hours, and then calcined at 1150° C. for 4 hours. After that, the temperature was lowered to 60° C. for 4 hours, and the nitrogen atmosphere was returned to the air, and the spherical particles were taken out when the temperature was 40° C. or lower.

Step 6 (Sorting Step):

After the aggregated particles were pulverized, they were subjected to magnetic separation to cut the low magnetic force products, sieved with a sieve with an opening of 250 m to remove coarse particles to obtain magnetic core particles 1 having a 50% particle diameter (D50) of 37.0 m based on volume distribution.

<Preparation of Coating Resin 1>

| | |
|---|---|
| Cyclohexyl methacrylate monomer | 26.8 parts by mass |
| Methyl methacrylate monomer | 0.2 parts by mass |
| Methyl methacrylate macromonomer | 8.4 parts by mass (macromonomer with a weight average molecular weight of 5000 having a methacryloyl group at one end) |
| Toluene | 31.3 parts by mass |
| Methyl ethyl ketone | 31.3 parts by mass |
| Azobisisobutyronitrile | 2.0 parts by mass |

Among the above materials, cyclohexyl methacrylate, methyl methacrylate, methyl methacrylate macromonomer, toluene, and methyl ethyl ketone were added to a 4-necked separable flask equipped with a reflux condenser, thermometer, nitrogen inlet, and stirrer, and nitrogen gas was introduced thereto to create sufficient a nitrogen atmosphere, and then the temperature was raised to 80° C., and azobisisobutyronitrile was added thereto and refluxed for 5 hours for polymerization. Hexane was injected into the resulting reactant to precipitate the copolymer, and the precipitate was separated by filtration and dried in vacuum to obtain coating resin 1. The resulting coating resin 1 at 30 parts by mass was dissolved in 40 parts by mass of toluene and 30 parts by mass of methyl ethyl ketone to obtain a polymer solution 1 (solid content: 30% by mass).

<Preparation of Coating Resin Solution 1>

| | |
|---|---|
| Polymer solution 1 (concentration of the resin solid content was 30%) parts by mass | 33.3 |
| Toluene parts by mass | 66.4 |
| Carbon black (Regal 330; manufactured by Cabot Corporation) | 0.3 |

parts by mass (primary particle diameter 25 nm, nitrogen adsorption specific surface area 94 $m^2/g$, and DBP oil absorption 75 ml/100 g)

were dispersed with a paint shaker for 1 hour using zirconia beads with a diameter of 0.5 mm. The resulting dispersion was filtered through a 5.0 m membrane filter to obtain coating resin solution 1.

Production Example of Magnetic Carrier 1

(Resin Coating Step):

A vacuum degassing kneader maintained at normal temperature was charged with the coating resin solution 1 so that the resin component was 2.5 parts by mass based on 100 parts by mass of the magnetic core particles 1. After the charging, the mixture was stirred at a rotation speed of 30 rpm for 15 minutes, and after a certain amount or more of the solvent (80% by mass) was volatilized, the temperature was raised to 80° C. while mixing under reduced pressure, toluene was distilled off over 2 hours, and then the mixture was cooled. The resulting magnetic carrier was subjected to magnetic separation to separate the low magnetic force products, passed through a sieve with an opening of 70 μm, and then classified with an air classifier to obtain magnetic carrier 1 having a 50% particle diameter (D50) of 38.2 m based on volume distribution.

Production Example of Two-Component Developer and Replenishment Developer

Toners 1 to 24 and magnetic carrier 1 were mixed with a V-type mixer (Type V-10: Tokuju Co., Ltd.) at 0.5 $s^{-1}$ and for a rotation time of 5 minutes so that the toner concentration was 8.0% by mass to obtain two-component developers 1 to 24.

In addition, toners 1 to 24 and magnetic carrier 1 were mixed with a V-type mixer (Type V-10: Tokuju Co., Ltd.) at 0.5 $s^{-1}$ and for a rotation time of 5 minutes so that the toner concentration was 95.0% by mass to obtain replenishment developers 1 to 24 shown in Table 6.

Example 1

<Evaluation>

The two-component developer 1 and replenishment developer 1 were used to carry out the following low-temperature fixability evaluation, image heat resistance evaluation, and curl resistance evaluation.

A full-color copier imagePress C800, manufactured by Canon Inc., was modified so that the fixing temperature and process speed could be set freely. A two-component developer for cyan toner was put into each color developer, a replenishment developer vessel containing a replenishment developer for cyan toner was set in each color unit, images were formed, and various evaluations were made while conducting a durability test.

Evaluation was made based on the following evaluation methods, and Table 6 shows the results.

[Evaluation 1. Evaluation of Low-Temperature Fixability]

The images were outputted in a monochromatic mode under a normal temperature and normal humidity environment (temperature of 23° C. and relative humidity of 50% to 60%) so that the amount of toner on the paper was adjusted to 1.2 mg/cm$^2$, the print ratio was 25%, and the images were unfixed. The evaluation paper used was copy paper GF-C081 (A4, basis weight 81.4 g/m$^2$, sold by Canon Marketing Japan Inc.).

Then, under a low-temperature and low-humidity environment (temperature of 15° C. and relative humidity of 10% or less), the process speed was set to 450 mm/see, the fixing temperature was gradually raised from 120° C. by 2.5° C., and the minimum temperature with no offset was defined as the fixable temperature.

(Evaluation Criteria for Fixable Temperature)

- A: Lower than 150° C. (very good)
- B: 150° C. or higher and lower than 155° C. (good)
- C: 155° C. or higher and lower than 160° C. (the level at which the effects of the present invention are obtained)
- D: 160° C. or higher (unacceptable in the present invention)

[2. Image Heat Resistance Evaluation]

- Coated paper: Image Coat Gloss 128 (128.0 g/m$^2$) (sold by Canon Marketing Japan Inc.)
- Amount of toner applied: 1.20 mg/cm$^2$
- Evaluation image: a 100 cm$^2$ (10 cm×10 cm) image was placed in the center of the above A4 paper
- Fixing test environment: low-temperature and low-humidity environment (temperature of 15° C. and humidity of 10% RH)
- Process speed: 450 mm/sec
- Fixing temperature: low-temperature fixability evaluation temperature +10° C.

The above image forming apparatus was used to output one fixed image under the above conditions, and a bundle of paper (CS-680 (sold by Canon Marketing Japan Inc.); 500 sheets) was stacked thereon, and the output and the bundle of paper were placed in a constant temperature bath set at 30° C. and 80% RH and allowed to stand for 1 hour. After that, the temperature of the constant temperature bath was reset to the following evaluation conditions, and then allowed to stand for 10 hours. Next, the output and one sheet of paper thereon were removed from the constant temperature bath and allowed to cool for 1 hour, after which the two sheets were released. At that time, whether or not the image was adhered was evaluated.

(Evaluation Criteria)

- A1: The output is easily released at a temperature condition of 65° C. in the constant temperature bath. (Very good)
- A2: A load is felt when releasing the output at a temperature condition of 65° C. in the constant temperature bath, but no gloss unevenness appears in the image. (Very good)
- B1: The output is easily released at a temperature condition of 60° C. in the constant temperature bath. (Good)
- B2: A load is felt when releasing the output at a temperature condition of 60° C. in the constant temperature bath, but no gloss unevenness appears in the image. (Good)
- C: The outputs do not adhere to each other at a temperature condition of 55° C. in the constant temperature bath. (This is a level that does not pose a problem in the present invention.)
- D: The outputs adhere to each other at a temperature condition of 55° C. in the constant temperature bath, and the outputs are torn if they are released strongly. (This is unacceptable in the present invention)

[Evaluation 3: Evaluation of Curl Resistance]

The above image forming apparatus was used to carry out evaluation using PB PAPER (66.0 g/m$^2$, letter, sold by Canon Marketing Japan Inc.) as evaluation paper under a high-temperature and high-humidity environment (temperature of 35° C. and humidity of 85% RH).

In the single-side continuous printing mode, 100 sheets were continuously printed with a front margin of 3 mm, a rear margin of 3 mm, and left and right margins of 3 mm each, and solid images of 1.20 mg/cm$^2$ were outputted.

Under the same environment, 100 sheets were stacked with the solid image surface after image output facing upward, and then a weight of 210 mm×30 mm and weighing 100 g was placed on the trailing edge side of the paper so as to align the 210 mm side surface with the trailing edge line of the paper. Then, the height of the trailing edge of the paper and the height of the leading edge of the paper were measured, and then the height of the trailing edge side was subtracted from the height of the leading edge side, then divided by the height of the trailing edge side and multiplied by 100 to obtain the height ratio (%). The larger the height ratio, the more curled, and the evaluation was made according to the following criteria.

(Evaluation Criteria)

A: The height ratio is less than 6%.

B: The height ratio is 6% or more and less than 11%.

C: The height ratio is 11% or more and less than 16%.

D: The height ratio is 16% or more.

Examples 2 to 18 and Comparative Examples 1 to 6

Evaluation was made in the same manner as in Example 1, except that the two-component developer used in the evaluation was changed to the two-component developers shown in Table 6. Table 6 shows the results.

TABLE 6

| | Two-Component Developer | | | | Low-Temperature Fixability Evaluation | | Image Heat Resistance Evaluation | Curl Resistance Evaluation |
|---|---|---|---|---|---|---|---|---|
| | Two-Component Developer | Replenishment Developer | Toner | Magnetic Carrier | Evaluation Rank | Fixable Temperature (° C.) | Evaluation Rank | Evaluation Rank |
| Example 1 | Two-Component Developer 1 | Replenishment Developer 1 | Toner 1 | Magnetic Carrier 1 | A | 140 | A1 | A |
| Example 2 | Two-Component Developer 2 | Replenishment Developer 2 | Toner 2 | Magnetic Carrier 1 | A | 140 | A1 | A |
| Example 3 | Two-Component Developer 3 | Replenishment Developer 3 | Toner 3 | Magnetic Carrier 1 | A | 140 | A2 | A |
| Example 4 | Two-Component Developer 4 | Replenishment Developer 4 | Toner 4 | Magnetic Carrier 1 | A | 142.5 | A1 | A |
| Example 5 | Two-Component Developer 5 | Replenishment Developer 5 | Toner 5 | Magnetic Carrier 1 | A | 140 | A1 | A |
| Example 6 | Two-Component Developer 6 | Replenishment Developer 6 | Toner 6 | Magnetic Carrier 1 | A | 140 | A2 | A |
| Example 7 | Two-Component Developer 7 | Replenishment Developer 7 | Toner 7 | Magnetic Carrier 1 | A | 145 | A2 | A |
| Example 8 | Two-Component Developer 8 | Replenishment Developer 8 | Toner 8 | Magnetic Carrier 1 | A | 145 | B1 | A |
| Example 9 | Two-Component Developer 9 | Replenishment Developer 9 | Toner 9 | Magnetic Carrier 1 | B | 150 | A2 | A |
| Example 10 | Two-Component Developer 10 | Replenishment Developer 10 | Toner 10 | Magnetic Carrier 1 | B | 150 | B2 | A |
| Example 11 | Two-Component Developer 11 | Replenishment Developer 11 | Toner 11 | Magnetic Carrier 1 | C | 155 | B1 | B |
| Example 12 | Two-Component Developer 12 | Replenishment Developer 12 | Toner 12 | Magnetic Carrier 1 | B | 150 | A1 | A |
| Example 13 | Two-Component Developer 13 | Replenishment Developer 13 | Toner 13 | Magnetic Carrier 1 | A | 140 | B1 | C |
| Example 14 | Two-Component Developer 14 | Replenishment Developer 14 | Toner 14 | Magnetic Carrier 1 | A | 140 | B1 | A |
| Example 15 | Two-Component Developer 15 | Replenishment Developer 15 | Toner 15 | Magnetic Carrier 1 | B | 150 | A2 | C |
| Example 16 | Two-Component Developer 16 | Replenishment Developer 16 | Toner 16 | Magnetic Carrier 1 | A | 140 | B1 | A |
| Example 17 | Two-Component Developer 17 | Replenishment Developer 17 | Toner 17 | Magnetic Carrier 1 | B | 150 | A1 | A |
| Example 18 | Two-Component Developer 18 | Replenishment Developer 18 | Toner 18 | Magnetic Carrier 1 | A | 140 | B1 | A |
| Comparative Example 1 | Two-Component Developer 19 | Replenishment Developer 19 | Toner 19 | Magnetic Carrier 1 | C | 155 | B2 | D |
| Comparative Example 2 | Two-Component Developer 20 | Replenishment Developer 20 | Toner 20 | Magnetic Carrier 1 | D | 160 | C | A |
| Comparative Example 3 | Two-Component Developer 21 | Replenishment Developer 21 | Toner 21 | Magnetic Carrier 1 | A | 140 | B2 | D |
| Comparative Example 4 | Two-Component Developer 22 | Replenishment Developer 22 | Toner 22 | Magnetic Carrier 1 | D | 170 | A1 | D |
| Comparative Example 5 | Two-Component Developer 23 | Replenishment Developer 23 | Toner 23 | Magnetic Carrier 1 | A | 140 | D | A |
| Comparative Example 6 | Two-Component Developer 24 | Replenishment Developer 24 | Toner 24 | Magnetic Carrier 1 | A | 140 | D | A |

The present invention makes it possible to provide a toner excellent in low-temperature fixability, heat-resistant storage stability, and curl resistance.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-046564, filed Mar. 23, 2022, Japanese Patent Application No. 2022-204134, filed Dec. 21, 2022, and Japanese Patent Application No. 2023-004801, filed Jan. 17, 2023, which are hereby incorporated by reference herein in their entirety.

What is claimed is:

1. A toner, comprising:

a toner particle containing a binder resin, the binder resin comprising a crystalline polyester, an amorphous resin A, an amorphous resin B, and an amorphous resin C;

amorphous resin A being a low-molecular-weight polyester;

amorphous resin B being a high-molecular-weight polyester; and amorphous resin C being a hybrid resin obtained by combining a polyester resin and an acrylic resin, wherein when differential scanning calorimetry (DSC) of the toner sequentially undergoes (i) a first temperature rise process of raising a temperature of the toner from normal temperature to 180° C. at a rate of 10° C./min, (ii) a first cooling process of cooling the toner from 180 to 25° C. at a rate of 10° C./min, (iii) a second cooling process of subsequently cooling the toner from 25 to 15° C. at a rate of 3° C./min, and (iv) a second temperature rise process of raising the temperature of the toner to 180° C. at a rate of 10° C./min, an exothermic amount P1 of an exothermic peak derived from the crystalline polyester present at 40 to 80° C. observed in the first cooling process is 1.00 J/g or less, an exothermic amount P2 of an exothermic peak derived from the crystalline polyester observed in the second cooling process is 0.10 J/g or more, $2.0 \leq P3-P4 \leq 10.0$ when P3 (J/g) is a sum of endothermic amounts of the endothermic peaks present at 40° C. or higher observed in the second temperature rise process, and P4 (J/g) is a sum of exothermic amounts of the exothermic peaks present at 40° C. or higher observed in the first cooling process, and $2.00 \leq SP1-SP4 \leq 2.90$ $0.20 \leq SP2-SP1 \leq 0.60$ $0.20 \leq SP3-SP2 \leq 0.60$ when SP1 $[(J/cm^3)^{0.5}]$ is an SP value of amorphous resin A, SP2 $[(J/cm^3)^{0.5}]$ is an SP value of amorphous resin B, SP3 $[(J/cm^3)^{0.5}]$ is an SP value of amorphous resin C, and SP4 $[(J/cm^3)^{0.5}]$ is an SP value of the crystalline polyester.

2. The toner according to claim 1, wherein P1 is 0.50 J/g or less.

3. The toner according to claim 1, wherein a content ratio of the crystalline polyester to the binder resin in the toner is 8.0 to 15.0% by mass.

4. The toner according to claim 1, wherein the toner contains a hydrocarbon-based wax, and $2 \leq T1-T2 \leq 10$ when T1 (° C.) is a melting point of the hydrocarbon-based wax and T2 (° C.) is a melting point of the crystalline polyester.

5. A two-component developer comprising:

a toner; and a magnetic carrier;

the toner comprising a toner particle containing a binder resin, the binder resin comprising a crystalline polyester, an amorphous resin A, an amorphous resin B, and an amorphous resin C;

amorphous resin A being a low-molecular-weight polyester;

amorphous resin B being a high-molecular-weight polyester; and amorphous resin C being a hybrid resin obtained by combining a polyester resin and an acrylic resin, wherein when differential scanning calorimetry (DSC) of the toner sequentially undergoes (i) a first temperature rise process of raising a temperature of the toner from normal temperature to 180° C. at a rate of 10° C./min, (ii) a first cooling process of cooling the toner from 180 to 25° C. at a rate of 10° C./min, (iii) a second cooling process of subsequently cooling the toner from 25 to 15° C. at a rate of 3° C./min, and (iv) a second temperature rise process of raising the temperature of the toner to 180° C. at a rate of 10° C./min, an exothermic amount P1 of an exothermic peak derived from the crystalline polyester present at 40 to 80° C. observed in the first cooling process is 1.00 J/g or less, an exothermic amount P2 of an exothermic peak derived from the crystalline polyester observed in the second cooling process is 0.10 J/g or more, $2.0 \leq P3-P4 \leq 10.0$ when P3 (J/g) is a sum of endothermic amounts of the endothermic peaks present at 40° C. or higher observed in the second temperature rise process, and P4 (J/g) is a sum of exothermic amounts of the exothermic peaks present at 40° C. or higher observed in the first cooling process, and $2.00 \leq SP1-SP4 \leq 2.90$ $0.20 \leq SP2-SP1 \leq 0.60$ $0.20 \leq SP3-SP2 \leq 0.60$ when SP1 $[(J/cm^3)^{0.5}]$ is an SP value of amorphous resin A, SP2 $[(J/cm^3)^{0.5}]$ is an SP value of amorphous resin B, SP3 $[(J/cm^3)^{0.5}]$ is an SP value of amorphous resin C, and SP4 $[(J/cm^3)^{0.5}]$ is an SP value of the crystalline polyester.

6. The toner according to claim 1, wherein amorphous resin A and amorphous resin B differ in weight average molecular weight by a factor of 3 or more.

* * * * *